US012686507B2

(12) United States Patent
Kopsaftopoulos et al.

(10) Patent No.: US 12,686,507 B2
(45) Date of Patent: Jul. 21, 2026

(54) MULTICOPTER ONLINE ROTOR FAULT DIAGNOSIS SYSTEM

(71) Applicant: RENSSELAER POLYTECHNIC INSTITUTE, Troy, NY (US)

(72) Inventors: Fotios Kopsaftopoulos, Niskayuna, NY (US); Airin Dutta, Troy, NY (US); Farhan Gandhi, Loudonville, NY (US)

(73) Assignee: Rennselaer Polytechnic Institute, Troy, NY (US)

( * ) Notice: Subject to any disclaimer, the term of this patent is extended or adjusted under 35 U.S.C. 154(b) by 0 days.

(21) Appl. No.: 18/715,809

(22) PCT Filed: Oct. 3, 2022

(86) PCT No.: PCT/US2022/045498
§ 371 (c)(1),
(2) Date: Jun. 3, 2024

(87) PCT Pub. No.: WO2023/101757
PCT Pub. Date: Jun. 8, 2023

(65) Prior Publication Data
US 2025/0033800 A1 Jan. 30, 2025

Related U.S. Application Data

(60) Provisional application No. 63/285,186, filed on Dec. 2, 2021.

(51) Int. Cl.
B64F 5/60 (2017.01)
(52) U.S. Cl.
CPC ..................................... B64F 5/60 (2017.01)
(58) Field of Classification Search
CPC ........ B64F 5/60; G01L 1/2225; G01M 13/02; B64D 2045/0085; B64D 45/00; B64U 10/16; B64U 2201/10; B64C 27/08
See application file for complete search history.

(56) References Cited

U.S. PATENT DOCUMENTS 9,240,083 B2 1/2016 Isom et al.
9,932,110 B2 4/2018 McNally
(Continued)

FOREIGN PATENT DOCUMENTS

CN 211669971 U 10/2020
CN 112882388 A 6/2021

OTHER PUBLICATIONS

International Search Report and The Written Opinion of the International Searching Authority, International Application No. PCT/US2022/045498, mailed Jan. 13, 2023.

*Primary Examiner* — Donald J Wallace
*Assistant Examiner* — Jalal C Coduroglu
(74) *Attorney, Agent, or Firm* — Barclay Damon LLP; Anthony P. Gangemi

(57) ABSTRACT

A multicopter rotor fault diagnosis system includes a multicopter, a plurality of local sensors, and a controller. The multicopter includes a body, a plurality of booms secured to the body, and a plurality of rotors. Each boom has a proximal end secured to the body and extends radially outward to a distal end. Each rotor is secured to the distal end of a respective boom. Each sensor is secured to a respective boom and is positioned a distance from the body. The local sensors are configured to measure out-of-plane strain of the booms and to continuously generate boom strain signals. The controller is in communication with the body and the local sensors. The controller is configured to receive the continuously generated boom strain signals and to perform a pattern recognition algorithm to simultaneously detect and identify faults associated with the rotors.

29 Claims, 17 Drawing Sheets

100

Direction of flight

(56) References Cited

U.S. PATENT DOCUMENTS

| | | | |
|---|---|---|---|
| 10,717,190 B2 | 7/2020 | Bosworth et al. | |
| 2018/0237148 A1 | 8/2018 | Hehn et al. | |
| 2018/0327111 A1* | 11/2018 | Huth | B64D 45/00 |
| 2018/0339768 A1* | 11/2018 | Wang | B64U 30/26 |
| 2019/0080446 A1* | 3/2019 | Kuzmin | G06V 30/144 |
| 2019/0088046 A1* | 3/2019 | Herlihy | G05D 1/0066 |
| 2020/0103922 A1* | 4/2020 | Nonami | B64U 10/16 |
| 2020/0331590 A1* | 10/2020 | Yuksel | B64U 30/20 |

* cited by examiner

100

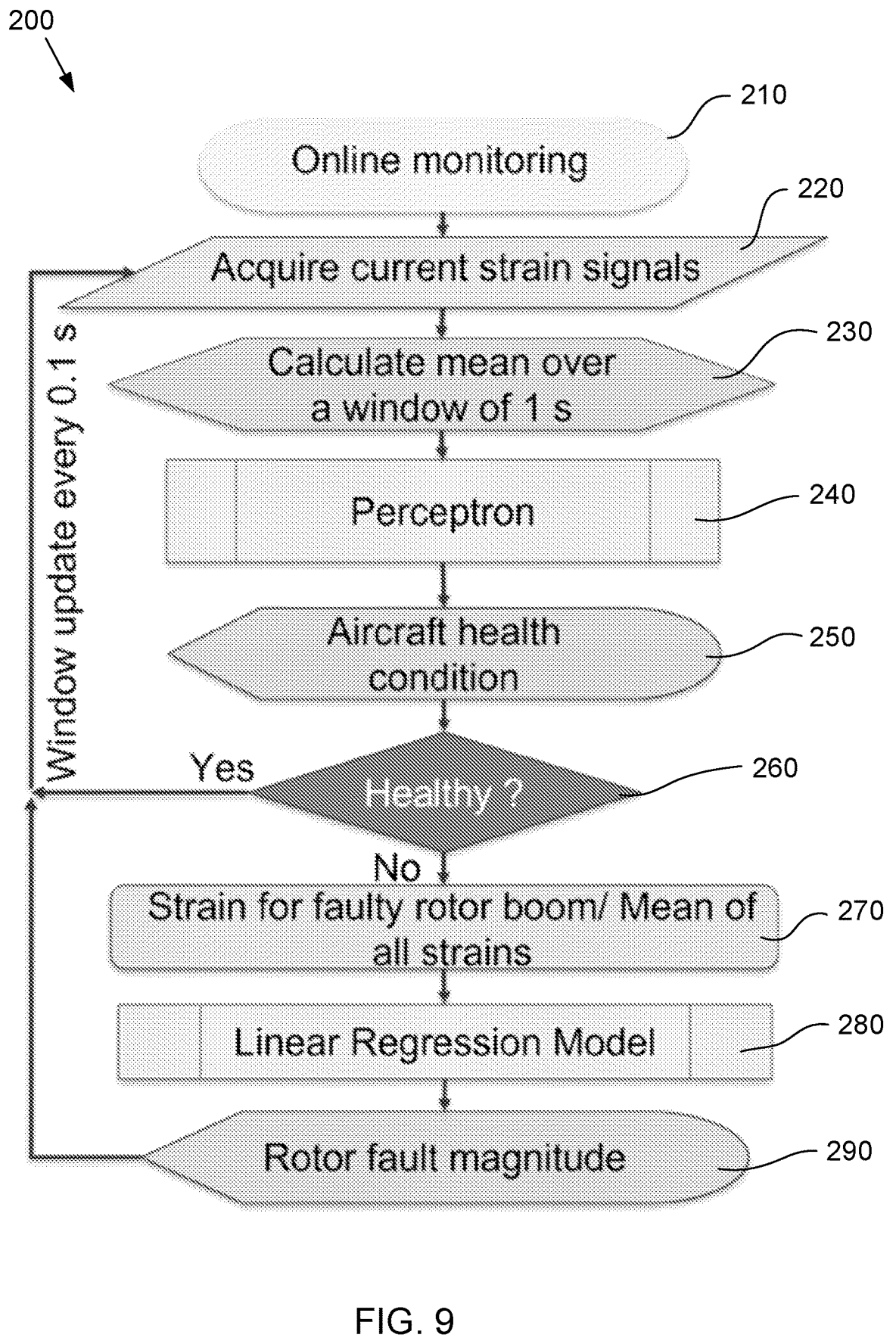

200

210 — Online monitoring

220 — Acquire current strain signals

230 — Calculate mean over a window of 1 s

240 — Perceptron

250 — Aircraft health condition

260 — Healthy ?

Yes

Window update every 0.1 s

No

270 — Strain for faulty rotor boom/ Mean of all strains

280 — Linear Regression Model

290 — Rotor fault magnitude

FIG. 9

MULTICOPTER ONLINE ROTOR FAULT DIAGNOSIS SYSTEM

CROSS REFERENCE TO RELATED APPLICATION(S)

This application claims the priority benefit of U.S. Provisional Patent Application No. 63/285,186, filed Dec. 2, 2021, which is incorporated by reference as if disclosed herein in its entirety.

STATEMENT REGARDING FEDERALLY SPONSORED RESEARCH AND DEVELOPMENT

The present invention was made with government support under Grant No. FA9550-19-1-0054 awarded by the United States Air Force Office of Scientific Research. The government has certain rights in the invention.

FIELD

The present technology relates generally to the field of rotorcraft, and more particularly, to systems and methods for online rotor fault detection, identification, and quantification in multicopters operating under multiple flight states and external disturbances.

BACKGROUND

Advanced aerial mobility ("AAM") powered by autonomous electric VTOL ("eVTOL") aircraft is set to revolutionize urban transport by adding a third dimension of mobility. Its capabilities are expected to expand beyond on-demand passenger and cargo mobility, and to surveillance for public safety, humanitarian aid, infrastructure supervision, remote sensing, etc. The current interest is towards real-time system-level awareness and safety assurance that will enable transition from "automation" to "autonomy" in AAM vehicles.

Multicopters, i.e., rotorcraft with more than four rotors being capable of VTOL and performing agile maneuvers, have attracted interest as a feasible platform for the development of future AAM aircraft. They have improved performance stemming from their rotor redundancy and have better design flexibility, the ability to integrate distributed electric propulsion, and better fault robustness and compensation capabilities compared to traditional VTOL/rotorcraft. Given their increasing importance and likely widespread use, accurate and robust fault detection and identification ("FDI") are critical to ensure the vehicles' overall safety and reliability within complex dynamic and uncertain environments. But, due to the strong dynamic coupling between rotors, fuselage, booms, and control inputs, and time-varying, cyclo-stationary, and non-linear behavior, they face certain system modeling and FDI challenges that are not present in fixed wing aircraft.

Recently, attempts have been made to address these issues through model representations (e.g., linear time-invariant, linear parameter varying, and non-linear models), signal processing techniques (e.g., in time- and frequency-domain, Kalman filter), and computational intelligence approaches (e.g., neural networks, fuzzy logic, hidden Markov models, dynamic Bayesian network, Gaussian mixture models, support vector machines). However, these attempted solutions are limited by analytical model building with the assumption that the physical knowledge of the system is available, use of arbitrary thresholds for detecting faults, and/or mostly concentrating on structural faults of blades, propellers, powertrain, etc. in rotorcraft.

What is needed, therefore, is an improved rotor fault diagnosis system and method that addresses at least the problems described above.

SUMMARY

According to an embodiment of the present technology, a multicopter rotor fault diagnosis system is provided. The system includes a multicopter, a plurality of local sensors, and a controller. The multicopter includes a body, a plurality of booms secured to the body, and a plurality of rotors. Each of the plurality of booms has a proximal end secured to the body and extends radially outward to a distal end. Each of the plurality of rotors are secured to the distal end of a respective one of the plurality of booms. Each of the plurality of sensors are secured to a respective one of the plurality of booms and are positioned a distance from the body. The plurality of local sensors are configured to measure out-of-plane strain of the plurality of booms and to continuously generate boom strain signals. The controller is in communication with the body and the plurality of local sensors. The controller is configured to receive the continuously generated boom strain signals and to perform a pattern recognition algorithm to simultaneously detect and identify faults associated with the plurality of rotors.

In some embodiments, each of the plurality of local sensors are secured to the proximal end of the respective one of the plurality of booms and positioned adjacent the body.

In some embodiments, each of the plurality of local sensors is a strain gauge.

In some embodiments, the pattern recognition algorithm includes a perceptron that is configured to receive as input a mean value of the boom strain signals over a period and to output one of a plurality of linearly separable classes associated with a flight state of the multicopter.

In some embodiments, the period is 1 second and the mean value of the boom strain signals is recalculated every 0.1 seconds based on the continuously generated boom strain signals.

In some embodiments, the plurality of linearly separable classes includes healthy flight with wind gusts and with turbulence, healthy flight with gusts and without turbulence, healthy flight with turbulence and without wind gusts, healthy flight without turbulence and without wind gusts, and faults for each of the plurality of rotors.

In some embodiments, if the pattern recognition algorithm detects and identifies a fault associated with any one of the plurality of rotors, the controller is configured to perform a linear regression algorithm to quantify the fault of the rotor.

In some embodiments, the linear regression algorithm is configured to receive as input the out-of-plane strain measured by the local sensor of the boom associated with the faulty rotor divided by a mean out-of-plane strain of the plurality of booms and to output a predicted magnitude of degradation of the faulty rotor and a confidence interval of the predicted magnitude.

In some embodiments, if the pattern recognition algorithm detects and identifies a fault associated with any one of the plurality of rotors, the controller is configured to generate and communicate at least one corrective control signal to at least one of the non-faulty rotors to return the multicopter to a healthy flight state.

In some embodiments, the controller is a component of an onboard flight computer secured to the body of the multicopter.

According to another embodiment of the present technology, a method of diagnosing rotor fault in a multicopter is provided. The method includes: providing a multicopter in flight, the multicopter including a body; a plurality of booms secured to the body, each of the plurality of booms has a proximal end secured to the body and extends radially outward to a distal end; and a plurality of rotors, each of which are secured to the distal end of a respective one of the plurality of booms; continuously measuring, via a plurality of local sensors, out-of-plane strain of the plurality of booms to continuously generate boom strain signals, each of the plurality of local sensors are secured to a respective one of the plurality of booms and positioned a distance from the body; receiving, at a controller in communication with the body and the plurality of local sensors, the continuously generated boom strain signals; and performing, via the controller, a pattern recognition algorithm to simultaneously detect and identify faults associated with the plurality of rotors.

In some embodiments, each of the plurality of local sensors are secured to the proximal end of the respective one of the plurality of booms and positioned adjacent the body.

In some embodiments, each of the plurality of local sensors is a strain gauge.

In some embodiments, the step of performing the pattern recognition algorithm includes: calculating an initial mean value of the boom strain signals received over an initial 1 second duration; inputting the mean value of the boom strain signals into a perceptron trained using data associated with a plurality of multicopter flight states and rotor fault scenarios; and outputting one of a plurality of linearly separable classes associated with a flight state of the multicopter.

In some embodiments, if the perceptron outputs a linearly separable class associated with a healthy flight state of the multicopter, the step of performing the pattern recognition algorithm further includes: calculating an updated mean value of the boom strain signals received over an updated 1 second duration shifted 0.1 seconds forward from the initial 1 second duration; and repeating the inputting and outputting steps to determine an updated flight state of the multicopter based on the updated mean value of the boom strain signals.

In some embodiments, the plurality of linearly separable classes includes healthy flight with wind gusts and with turbulence, healthy flight with gusts and without turbulence, healthy flight with turbulence and without wind gusts, healthy flight without turbulence and without wind gusts, and faults for each of the plurality of rotors.

In some embodiments, if the pattern recognition algorithm detects and identifies a fault associated with any one of the plurality of rotors, the method further includes: performing, via the controller, a linear regression algorithm to quantify the fault of the rotor.

In some embodiments, the step of performing the linear regression algorithm includes: inputting the out-of-plane strain measured by the local sensor of the boom associated with the faulty rotor divided by a mean out-of-plane strain of the plurality of booms into a linear regression model trained using data associated with a plurality of multicopter flight states and rotor fault levels; and outputting a predicted magnitude of degradation of the faulty rotor and a confidence level of the predicted magnitude.

In some embodiments, if the pattern recognition algorithm detects and identifies a fault associated with any one of the plurality of rotors, the method further includes: generating, via the controller, at least one corrective control signal; and communicating the at least one corrective control signal to at least one of the non-faulty rotors to return the multicopter to a healthy flight state.

In some embodiments, the controller is a component of an onboard flight computer secured to the body of the multicopter.

Further objects, aspects, features, and embodiments of the present technology will be apparent from the drawing Figures and below description.

BRIEF DESCRIPTION OF DRAWINGS

Some embodiments of the present technology are illustrated as an example and are not limited by the figures of the accompanying drawings, in which like references may indicate similar elements.

FIG. 9 is a flowchart showing a method of multicopter rotor fault diagnosis according to an exemplary embodiment of the present technology.

DETAILED DESCRIPTION

Accordingly, exemplary embodiments of the present technology are directed to systems and methods for machine-learning based probabilistic online rotor fault diagnosis in multicopters. The systems and methods use in-flight out of-plane strain measurements at each of the multicopter booms to detect, identify, and quantify rotor faults while distinguishing them from the aircraft response to random wind gusts and turbulence. In exemplary embodiments, the systems and methods are demonstrated with application to a 2-feet diameter (rotor hub-to-hub distance) hexacopter flying under varying forward velocity and gross weight configurations, atmospheric disturbances, and uncertainty. In some embodiments, the rotor fault diagnosis involves two phases. First, a perceptron classifies the aircraft's health condition. Second, if a rotor fault is detected, it is simultaneously identified and a fault magnitude estimation phase is initiated, in which linear regression models are used to predict the respective rotor degradation values with their 95% confidence intervals. In exemplary embodiments, the generalization capability of the method is established with several test data under unmodeled operating conditions (not used in the training phase). Accordingly, embodiments of the present technology accurately diagnose even minor rotor faults of 8% degradation while distinguishing them from aggressive gusts of up to 10 m/s in magnitude. In some embodiments, the maximum fault detection time is less than 0.3 s. In some embodiments, the health state classification and the rotor fault magnitude quantification accuracy are over 99%.

Figure 1:
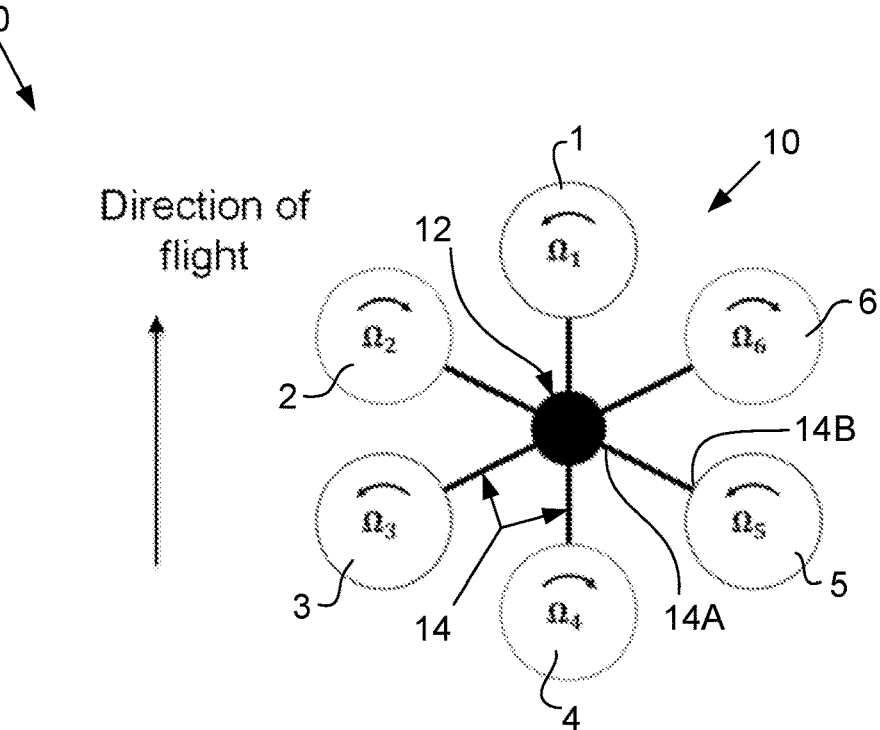
FIG. 1 is a schematic view of a multicopter rotor fault diagnosis system according to an exemplary embodiment of the present technology.

As shown in FIG. 1, a multicopter rotor fault diagnosis system is generally designated by the numeral 100. The system 100 includes a multicopter 10. The multicopter 10 includes a body 12 and a plurality of booms 14 secured to the body 12. Each of the plurality of booms 14 has a proximal end 14A secured to the body 12 and a distal end 14B that extends radially outward from the body 12. The multicopter 10 has a plurality of rotors, each one of which is secured to the distal end 14B of a respective one of the plurality of booms 14. In the exemplary embodiments shown in the figures and discussed herein, the multicopter 10 is a hexacopter having six rotors, which are designated in the figures by the numerals 1, 2, 3, 4, 5, 6. However, the present technology is not limited in this regard contemplates embodiments in which the multicopter 10 has any number of rotors, such as one, two, three, four, five, seven, eight, etc.

Figure 2:
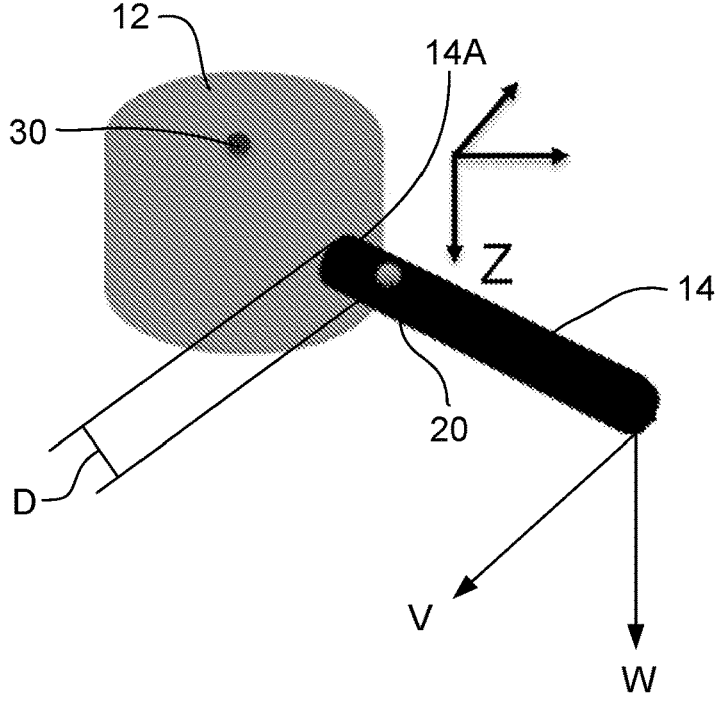
FIG. 2 is an enlarged view showing the placement of the local sensors on the booms of the multicopter of FIG. 1.

As shown in FIG. 2, the system includes a plurality of local sensors 20. Each of the local sensors 20 is secured to a respective one of the plurality of booms 14 and positioned a distance D from the body 12. In some embodiments, the distance D is in the range of 10% to 90% of the overall length of the boom 14. In some embodiments, the distance D is in the range of 20% to 80% of the overall length of the boom 14. In some embodiments, the distance D is in the range of 30% to 70% of the overall length of the boom 14. In some embodiments, the distance D is less than 50% of the overall length of the boom 14. In some embodiments, the distance D is less than 30% of the overall length of the boom 14. In some embodiments, the distance D is less than 15% of the overall length of the boom 14. In some embodiments, the local sensors 20 are secured to the proximal ends 14A of the booms 14 and positioned adjacent the body 12 such that the local sensors 20 directly abut the body 12 or are positioned the distance D of less than or equal to 25% of the overall length of the boom 14. In some embodiments, the local sensors 20 are strain gauges. The local sensors 20 are configured to measure out-of-plane strain (e.g., bending) of the booms 14, as indicated by arrow W (as opposed to in-plane strain indicated by arrow V) in FIG. 2. The local sensors 20 continuously measure out-of-plane strain of the booms 14 and continuously generate boom strain signals and communicate the boom strain signals to a controller 30 that is in communication with the local sensors 20. In some embodiments, the controller 30 is a component of an onboard flight computer that is secured to the body 12 such that the controller 30 is in electrical communication with the local sensors 20. In some embodiments, the controller 30 is located remotely from the body 12 such that the controller 30 is in wireless communication with the local sensors 20 and the onboard flight computer of the multicopter 10. The controller 30 is configured to receive the continuously generated boom strain signals from the local sensors 20 and to perform, via e.g., processors, non-transitory computer readable memory and storage, etc., the rotor fault diagnosis method discussed herein.

In an exemplary embodiment, a flight simulation model was developed for the multicopter 10 using the summation of forces and moments to calculate aircraft accelerations. The model was used as the source of data under varying operating and environmental conditions, and different rotor fault types. Rotor loads were calculated using Blade Element Theory coupled with a 3×4 Peters-He finite-state dynamic wake model. The model simulates abrupt rotor failure by ignoring the failed rotor inflow states and setting the output rotor forces and moments to zero. A feedback controller is implemented on the nonlinear model to stabilize the aircraft altitude and attitudes, and track desired trajectories written in terms of the aircraft velocities. This controller is designed at multiple trim points, with gain scheduling between these points to improve performance throughout the flight envelope. This control design has been demonstrated to perform well even in the event of failure of rotors 1, 2, or 6 (e.g., the front-most rotors while the multicopter 10 is in the direction of flight as indicated by arrow F in FIG. 1), with no adaptation in the control laws themselves. The 12 rigid body states are defined as:

$$x = \{X\,Y\,Z\,\phi\,\psi\,u\,v\,w\,p\,q\,r\}^T \tag{1}$$

The input vector includes the first four independent multirotor controls for collective, roll, pitch, and yaw, and is defined in Eq. 2:

$$u = \{\Omega_0\Omega_R\Omega_P\Omega_Y\}^T \tag{2}$$

In an exemplary embodiment, the booms 14 of the hexacopter were modeled as one-dimensional Euler-Bernoulli beams with an added tip mass and loading and were coupled to the rigid body motion of the vehicle. As shown in FIG. 2, the positive bending deflection of the boom 14 in the in-plane of the body 12 is indicated by arrow v and the positive bending deflection of the boom 14 in the out-of-plane of the body 12 is indicated by arrow w. In some embodiments, torsion and axial deformation are neglected. The beam equations are discretized in space using the Ritz method with 2 modes in each direction, as given in Eq. 3, with polynomial shape functions, $\phi$ that satisfy the geometric boundary conditions given by Eq. 4. To facilitate the inversion of the mass matrix that arises from this discretization, these polynomials are chosen to be orthogonal. The modes are obtained via eigen-analysis of the beam in a vacuum. The in-plane and out-of-plane deflections v and w, respectively, are given as follows:

$$v = \sum_{i=1}^{2} n_{v_i}(t)\phi_{v_i}(l) \qquad (3)$$

$$w = \sum_{i=1}^{2} n_{w_i}(t)\phi_{w_i}(l) \qquad (5)$$

where n represents the modal deformations, l is the non-dimensional boom coordinate representing the distance of a point on the boom 14 from its root (i.e., the proximal end 14A) normalized by the boom length. It ranges from 0 to 1, denoting the boom root and boom tip (i.e., distal end 14B), respectively. The geometric boundary conditions are given by:

$$w(0) = w'(0) = 0 \qquad (4)$$

$$v(0) = v'(0) = 0$$

The symbols ′ and ˙ designate d/dl and d/dt, respectively. The eight states for each flexible boom 14 are defined as follows:

$$x = \{n_{w_1} \, n_{w_2} \, n_{v_1} \, n_{v_2} \, \dot{n}_{w_1} \, \dot{n}_{w_2} \, \dot{n}_{v_1} \, \dot{n}_{v_2}\}^T \qquad (5)$$

In some embodiments, the sensor signals are calculated using the above aircraft states obtained from flight simulation data.

In some embodiments, a continuous Dryden wind turbulence model was incorporated into the flight simulation model to replicate realistic flight conditions. The Dryden model is dependent on altitude, length scale, direction-cosine matrix, body velocity, and turbulence intensity. It outputs the linear and angular velocity components of continuous turbulence as spatially varying stochastic signals. These signals are added to the inflow of each of the rotors by transforming them from the aircraft center-of-gravity to the corresponding rotor locations, to account for the effect of the turbulent wind velocities on the multicopter 10. The proper combination of the turbulence block parameters determines the fit of the signals to observed turbulence. In an exemplary embodiment, the altitude was taken as 5 m, and the overall length of the hexacopter was 0.6096 m (2 ft). The direction-cosine-matrix and forward velocity are determined from the instantaneous aircraft states during the simulation.

Figure 3A:
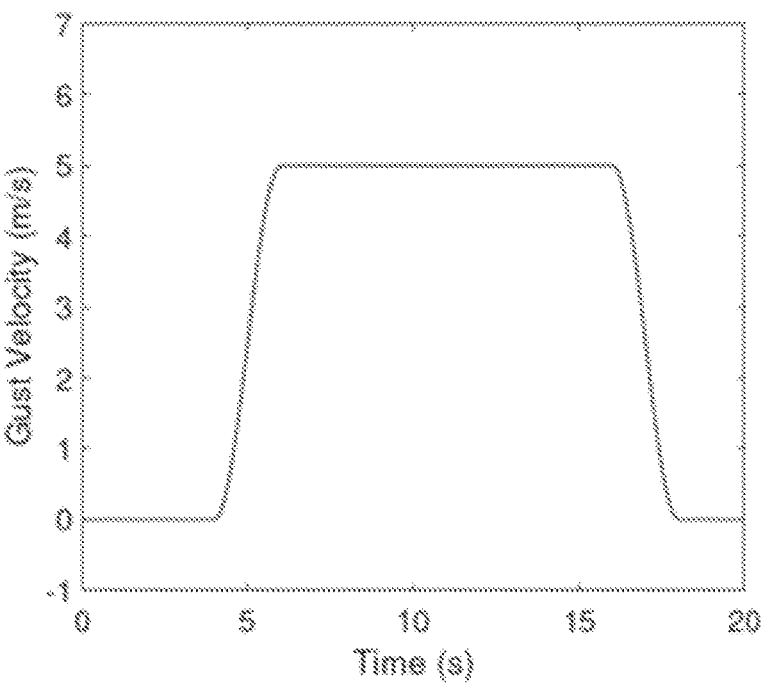
FIG. 3A is a chart of an indicative gust profile plotting the magnitude of gusts with time.
Figure 3B:
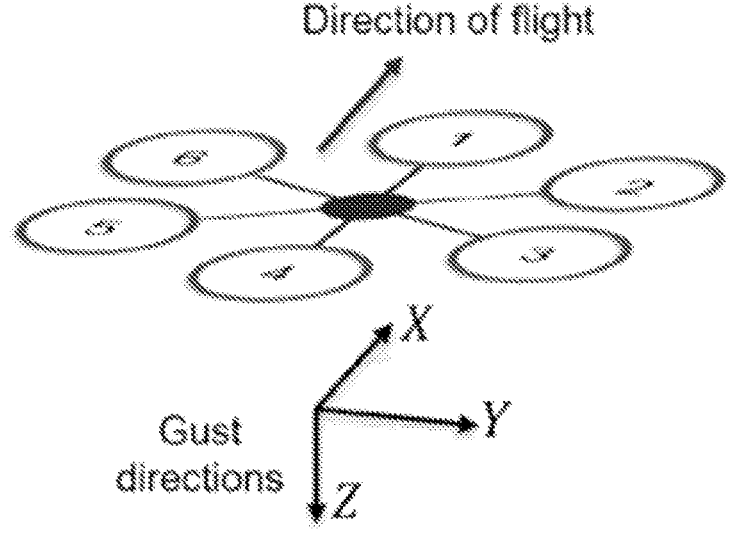
FIG. 3B is a schematic showing the direction of gusts.
Figure 4A:
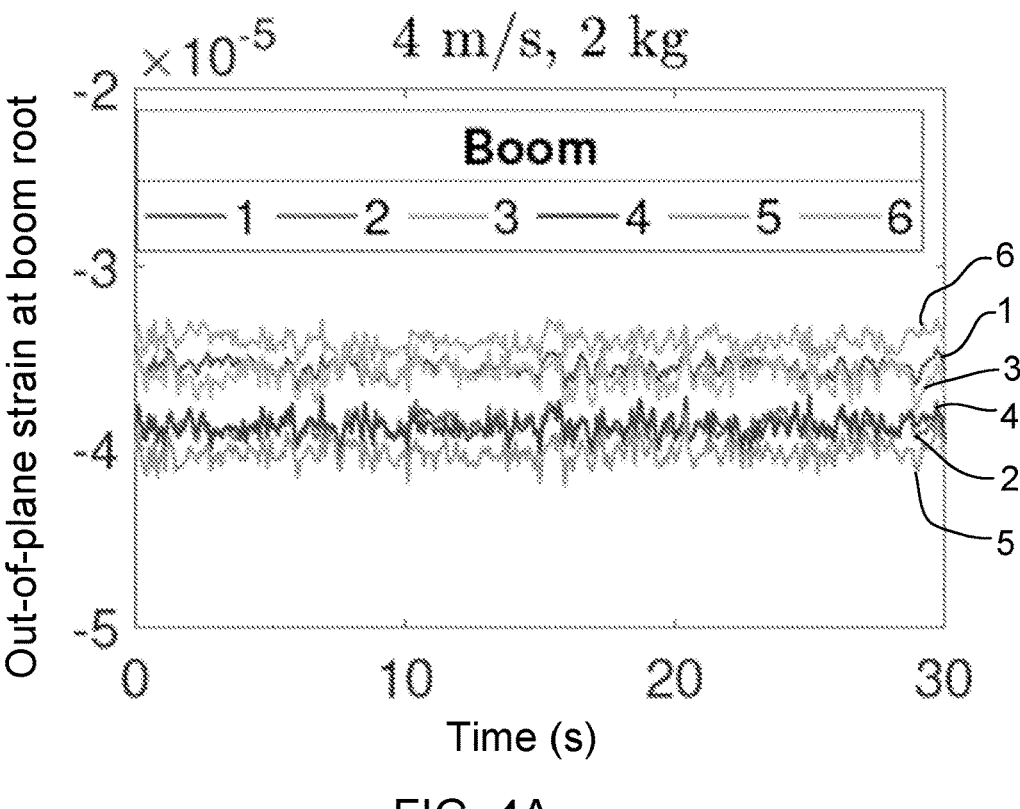
FIGS. 4A-4D are charts of healthy flight strain signals under various forward speed and gross weight configurations plotting the out-of-plane strain at the boom roots with time.
Figure 4B:
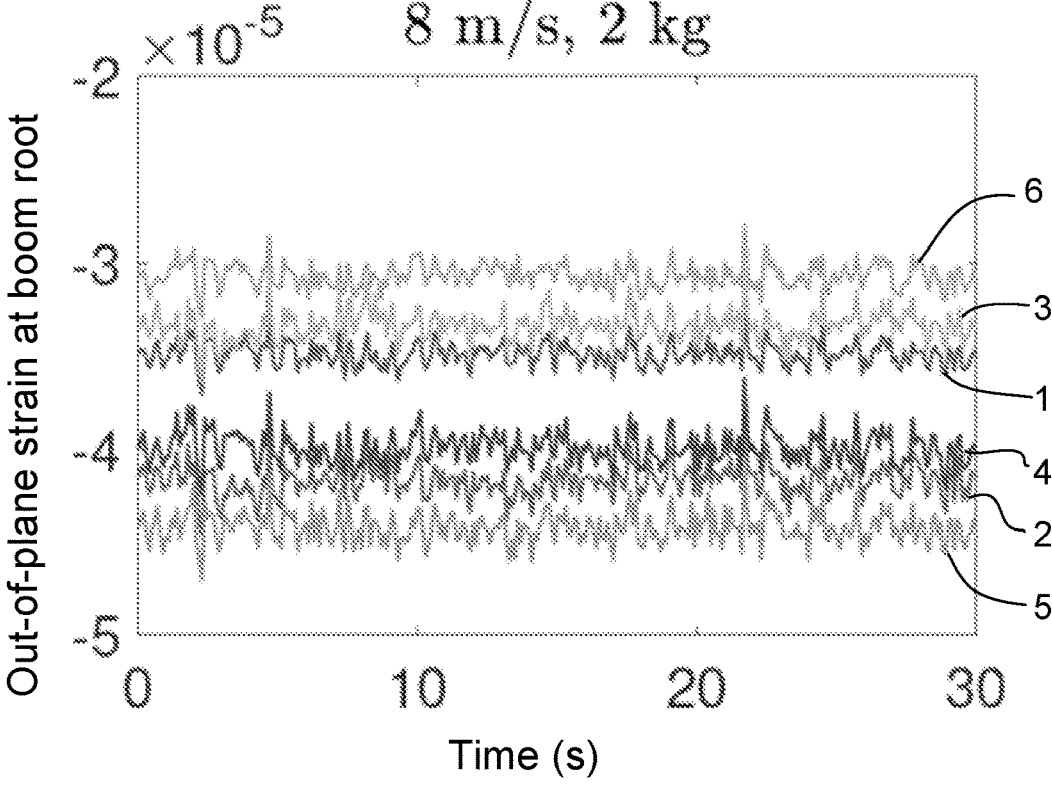
Figure 4C:
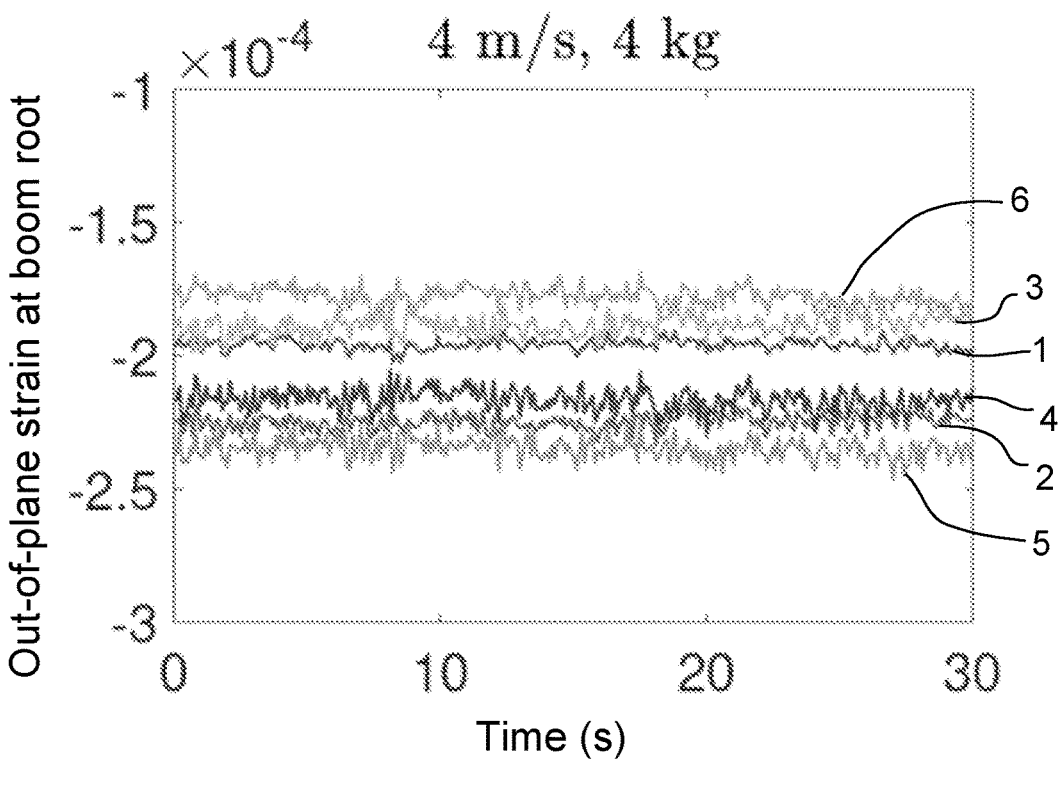
Figure 4D:
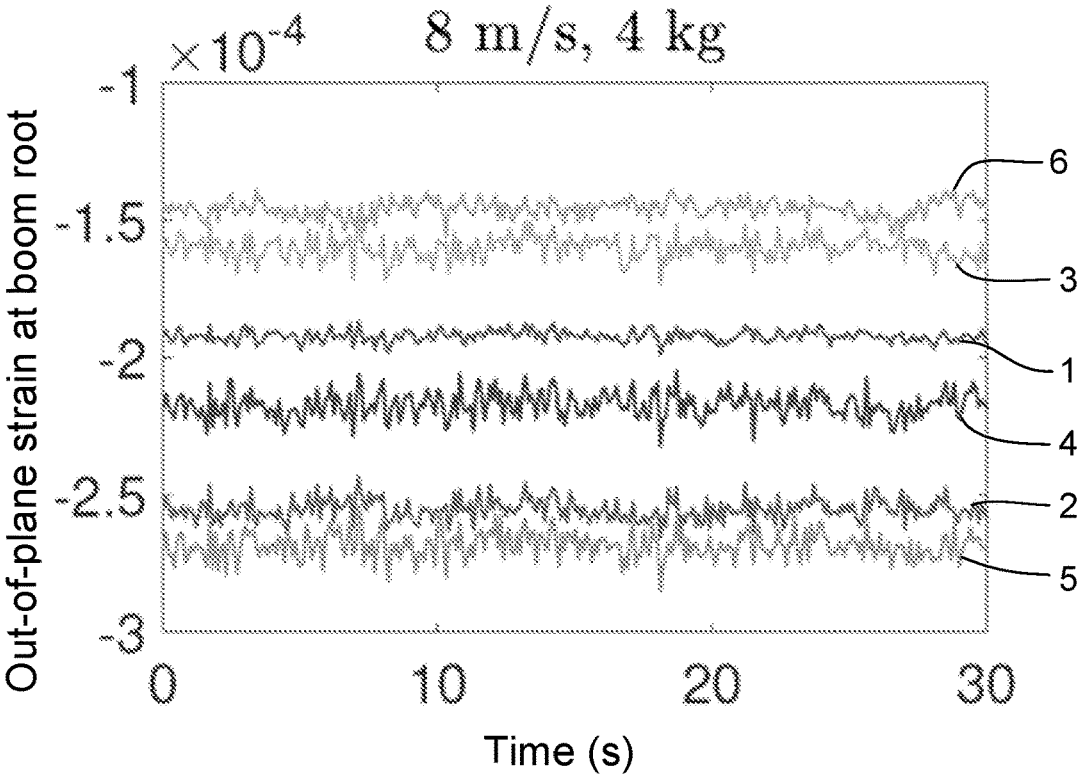

In some embodiments, data sets under different magnitude (5 m/s to 10 m/s) and directions of gusts for healthy flight under severe turbulence were next generated. The gusts follow a "1-cosine" shape with a gradual increase, followed by a steady-state and gradual decrease, as shown in FIG. 3A. As shown, the gusts commence at 2 s with a gradual increase from 0 to its full magnitude in the next 2 s, after which it becomes steady and lasts for 2 s, before gradually decreasing to zero again in the next 2 s. Therefore, in the simulated data gusts last from 2-8 s in a span of 10 s of healthy flight. The wind velocity directions are denoted by unit vectors with the positive X, Y, Z directions shown in FIG. 3B.

In some embodiments, the data sets were generated through a series of simulations for various operating conditions ranging from a forward speed of 4 m/s to 8 m/s and a gross weight of 2 to 4 kg. For gust-affected healthy flight, gusts of different magnitudes, e.g., 5, 8.67, and 10 m/s, and various directions were considered. The rotor fault types discussed herein are the front three rotors (rotors 1, 2, and 6 of the hexacopter 10 shown in FIG. 1), however embodiments of the present technology contemplate rotor fault types for any number and any combination of rotors. In some embodiments, rotor degradation of different magnitudes is replicated by reducing the commanded speed of that particular rotor with a multiplier ranging from 0 to 1, where "0" denotes 0% rotor degradation (i.e., healthy aircraft) and "1" implies 100% rotor degradation (i.e., complete rotor failure). The data sets generated under different operating and healthy conditions considered herein are summarized in Table 1 below. As discussed herein, "modeled" flight states or rotor degradation levels means that the training data sets were generated under these operating conditions, and the rest of the operating conditions used for generation of test data are referred to as "unmodeled."

TABLE 1

Summary of generated data sets

| Phase | Health conditions | Operating states | Rotor fault levels/Gust magnitudes/ Turbulence levels | Signal length |
|---|---|---|---|---|
| Training Data | Healthy flight | (4, 5, 6, 7, 8) m/s × (2, 3, 4) kg | Severe turbulence | 50 s |
| | Gust affected healthy flight | (4, 6, 8) m/s × (2, 4) kg | 8.67 m/s and 8 directions | 10 s |
| | Rotors 1, 2, and 6 faults | (4, 5, 6, 7, 8) m/s × (2, 3, 4) kg | 10, 50, 90% degradation | 50 s |
| Test Data | Healthy flight | (4.5, 5.5, 6.5, 7.5) m/s × (2.5, 3.5) kg | Severe turbulence | 30 s |
| | | (4, 5, 6, 7, 8) m/s × (2, 3, 4) kg | Light turbulence | 30 s |
| | Gust affected healthy flight | (4.5, 5.5, 6.5, 7.5) m/s × (2.5, 3.5) kg | (5, 10) m/s and 6 directions | 10 s |
| | Rotors 1, 2, and 6 faults | (4, 5, 6, 7, 8) m/s × (2, 3, 4) kg | 20, 30, 40, 60, 70, 80, 100% degradation | 50 s |
| | | (4.5, 5.5, 6.5, 7.5) m/s × (2.5, 3.5) kg | 20, 40, 60, 80, 100% degradation | 30 s |

Sampling frequency: $F_s$=10 Hz

In some embodiments, the local sensors 20 are strain gauges that are configured to be bonded directly onto aerospace structures to measure stresses along long-bearing components. Hence, the individual rotor speeds are monitored from the respective local sensor 20 readings, since the magnitude of the strain on each of the booms 14 depends on the thrust produced by the rotor mounted thereon. Actual rotor speeds give physical insight into the controller commands under rotor faults, and random gusts. In practice, the sensor readings will be stochastic in nature due to sensor noise and external disturbances during the flight. Therefore, the rotor fault diagnosis framework is configured to account for the noise and uncertainty in the signals.

Exemplary flight simulations for the hexacopter 10 were performed at the operating conditions specified in Table 1. FIGS. 4A-7B show signal time histories of strain gauges placed at all the boom roots (i.e., the proximal end 14A where the boom 14 connects to the body 12) for cases of healthy flight with and without gusts and different rotor fault scenarios under different operating condition. The strain plots corresponding to rotors 1, 2, 3, 4, 5, and 6 are respectively labeled 1, 2, 3, 4, 5, and 6. The x-axis shows the time in seconds, and the y-axis gives the value of out-of-plane (perpendicular to the rotor hub plane) strain at each of the 6 booms 14. These local signals, sampled at 10 Hz, were utilized for the development of the machine-learning based framework of probabilistic rotor fault detection, identification, and quantification for their certain characteristics, as discussed herein.

FIGS. 4A-4D show the strain at each of the boom roots in the out-of-plane direction while flying at 4 flight states (4 m/s×2 kg, 8 m/s×2 kg, 4 m/s×4 kg, and 8 m/s×4 kg) under severe turbulence in healthy condition. Though the signals are stochastic in nature, they possess a definite statistical mean value for each of the booms 14. These mean values of the strain on each boom 14 depend on the corresponding rotor thrust and, hence, the rotor speeds. Thus, these signals give an insight into the commanded rotor speeds when there are no rotor faults in the system. Note, that due to the coordinate system convention, the strains are expressed in negative values and the lesser values represent more amount of boom strains and consequently higher rotor speeds. Also, the total strain and consequently total rotor thrust is dictated by the gross weight of the aircraft, whereas the differential thrust, reflected in the range of the boom strains depend upon the commanded forward speed under healthy flight.

Figure 5A:
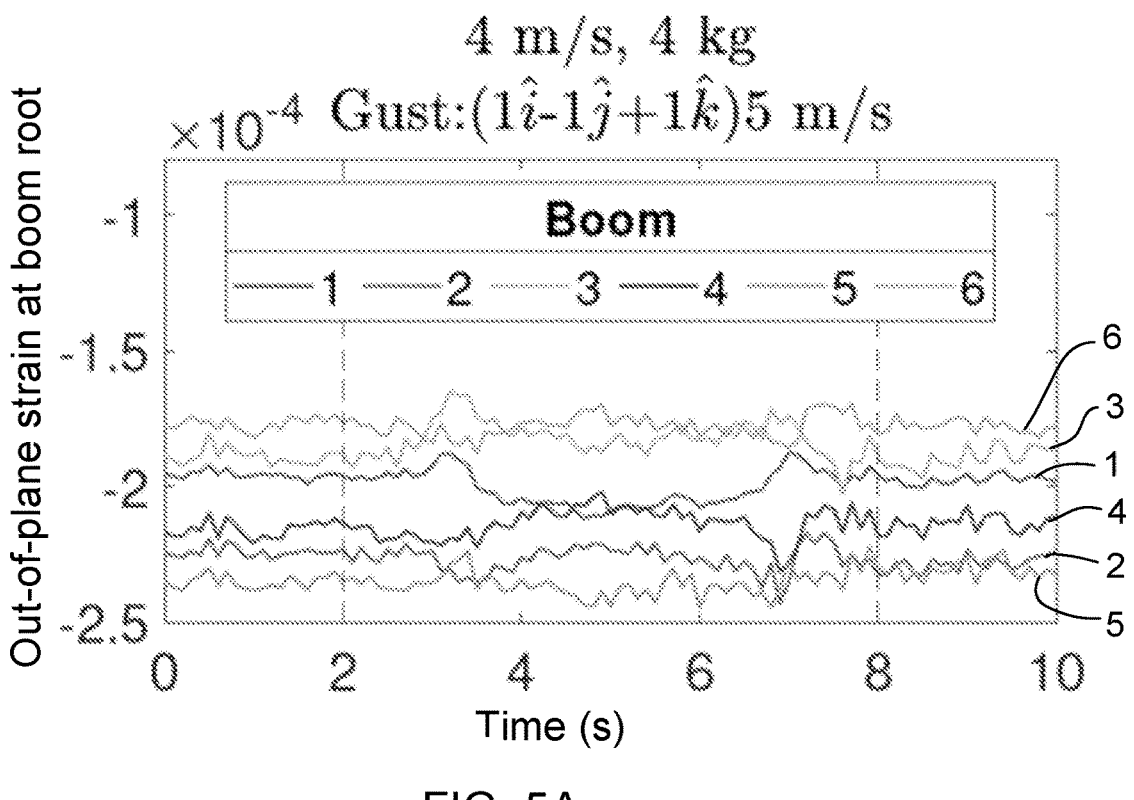
FIGS. 5A-5D are charts of indicative healthy flight strain signals under 8.67 m/s gusts from various directions under different operating conditions plotting the out-of-plane strain at the boom roots with time.
Figure 5B:
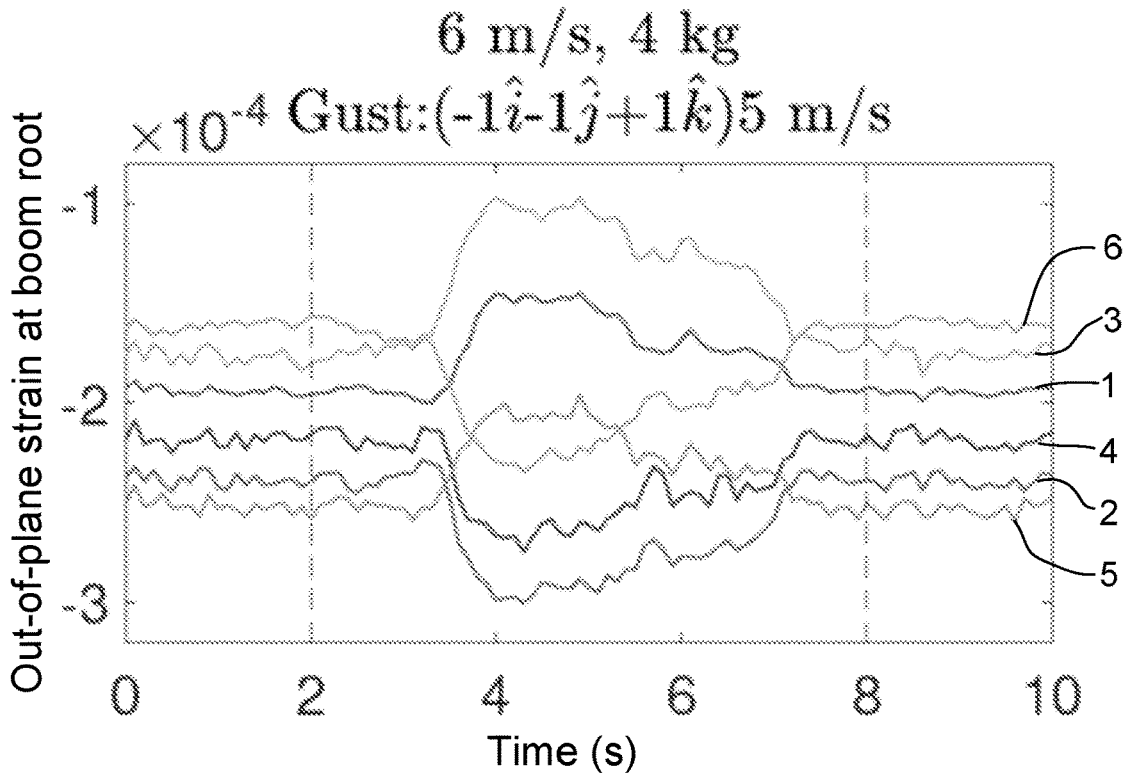
Figure 5C:
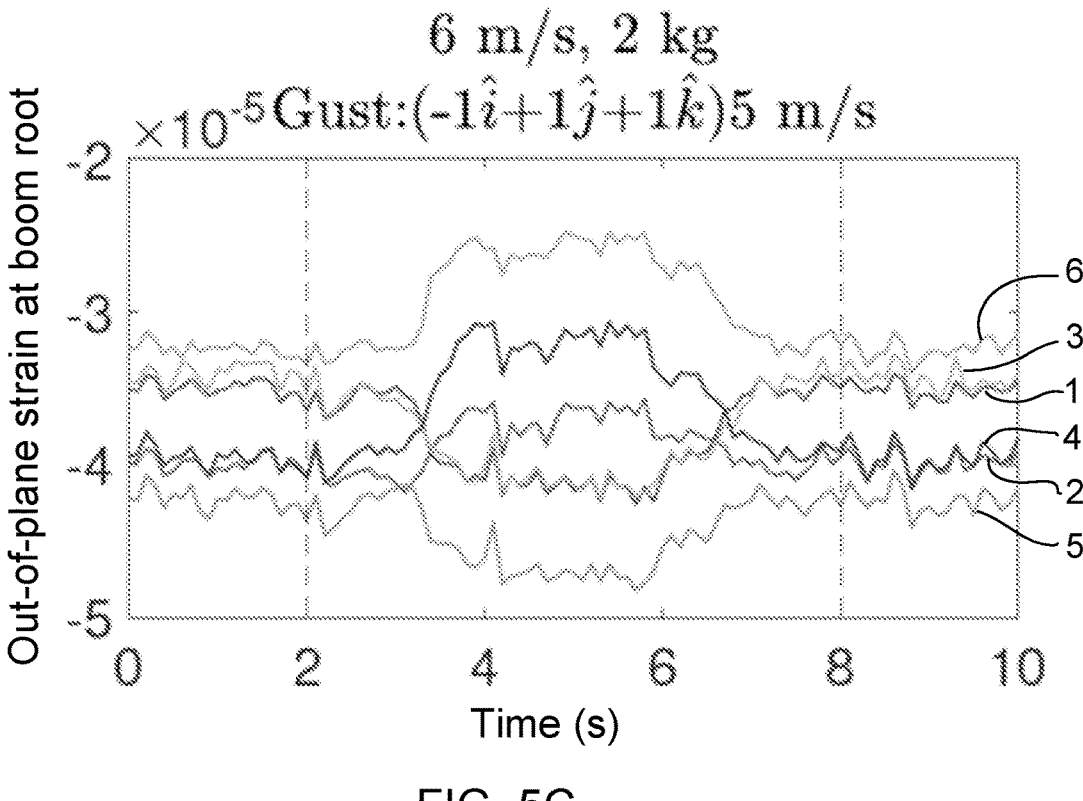
Figure 5D:
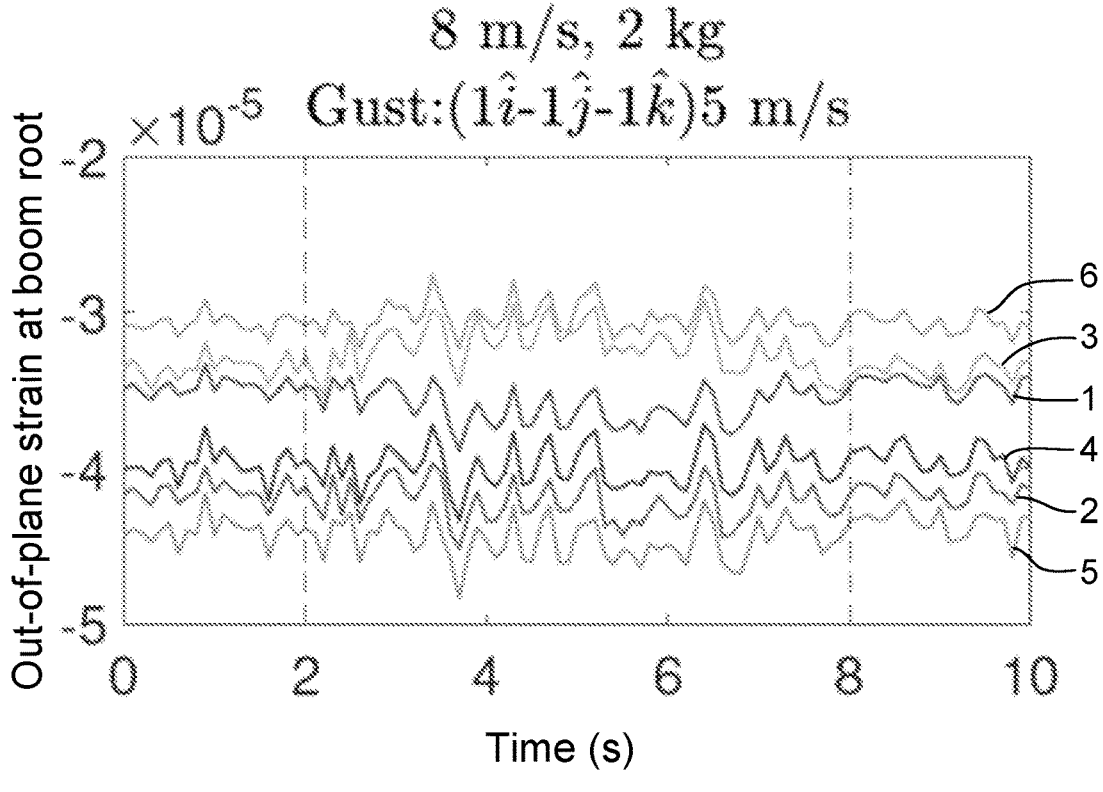

FIGS. 5A-5D show the time history of the strain signals under a few indicative gusts of magnitude 8.67 m/s coming at the aircraft from various directions while it is flying at different flight states. The gusts commence at 2 s and last until 8 s, shown by the dashed vertical lines. There are no rotor faults in the system. The flight states and the direction of the gusts are shown in the titles of each of the FIGS. 5A-5D. It is evident that there is a significant change in the mean values of strain signals, mostly during the steady gust phase lasting from 4 s to 6 s. As shown in FIG. 5C, the absolute value of strains in booms corresponding to rotors 4 and 6 decreases during gust, mimicking a rotor fault, where the rotor loses thrust. It is an object of the present technology to prevent such situations from being misclassified as rotor faults by considering the response of all the rotors represented by the corresponding strain values at their respective boom roots.

Figure 6A:
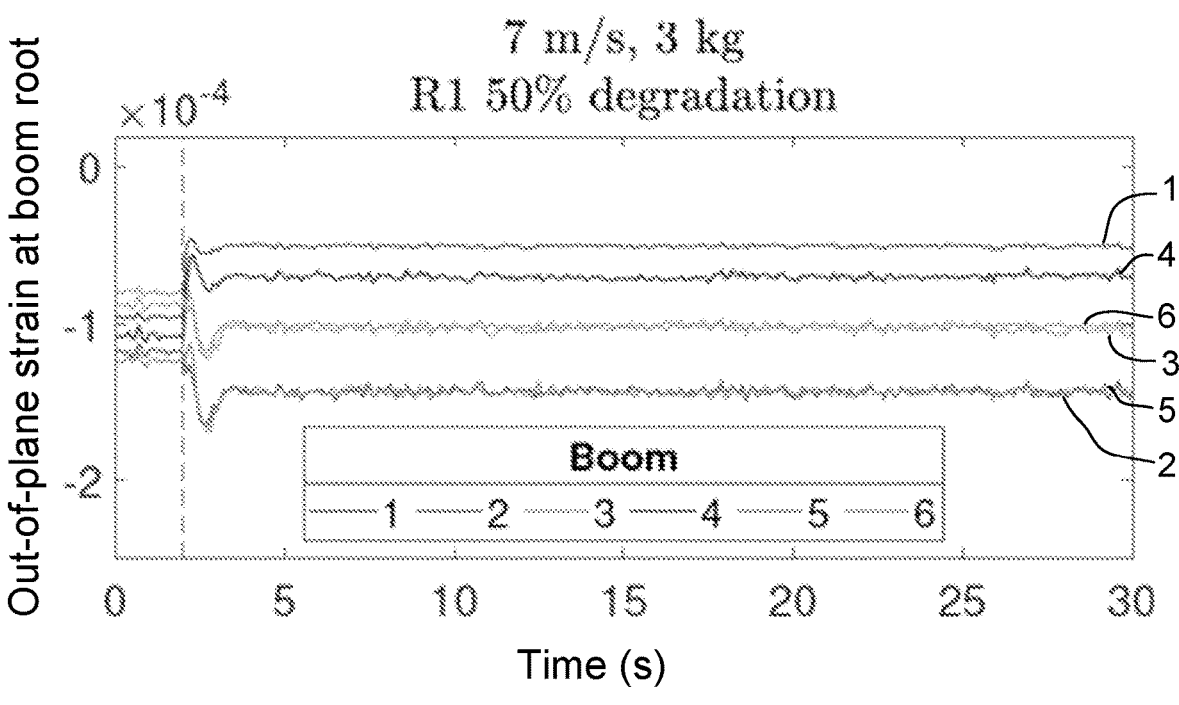
FIGS. 6A-6B are charts of indicative out-of-plane strain signals at each boom root under 50% and 90% degradation, respectively, of rotor 1 at 7 m/s and 3 kg plotting the out-of-plane strain at the boom roots with time.
Figure 6B:
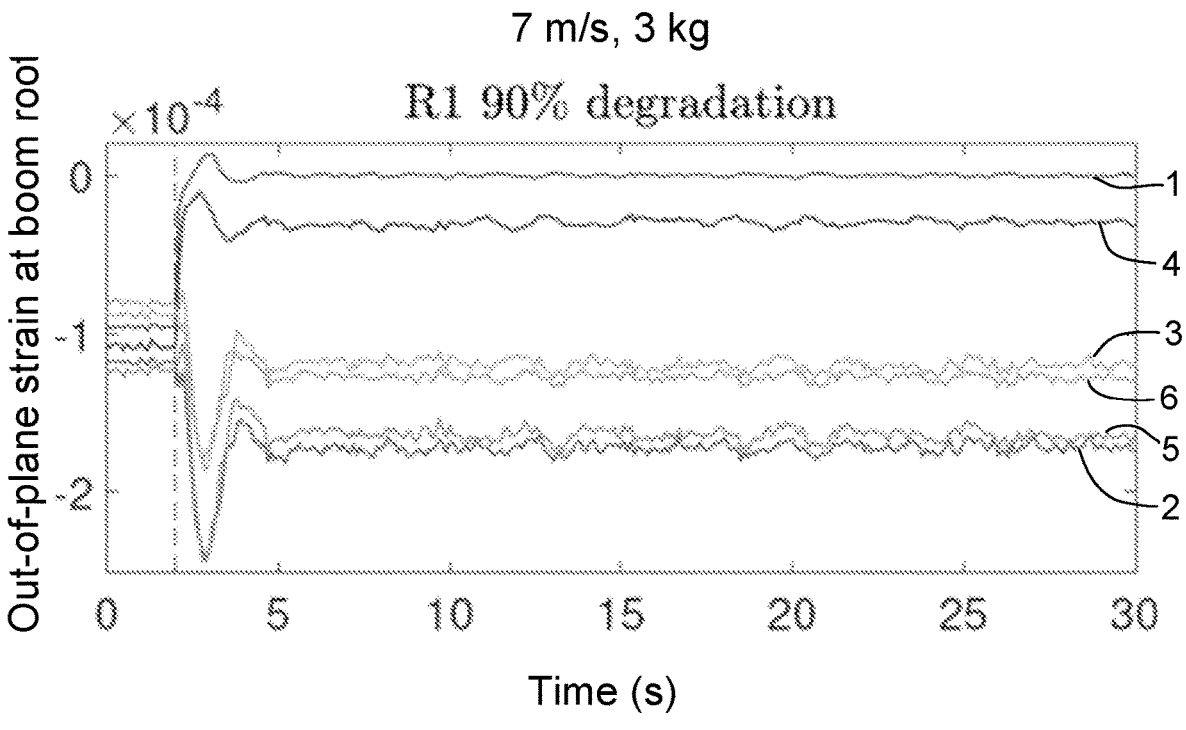
Figure 7A:
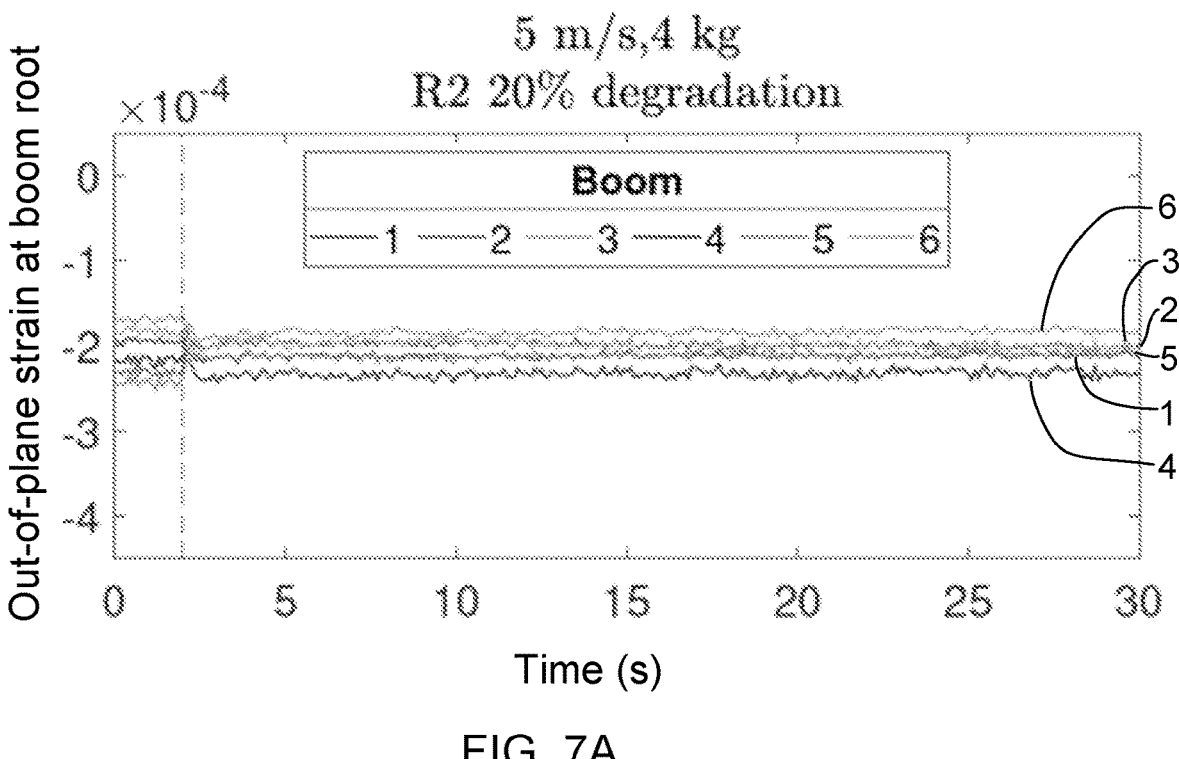
FIGS. 7A-7B are charts of indicative out-of-plane strain signals at each boom root under 20% and 100% degradation, respectively, of rotor 2 at 5 m/s and 4 kg plotting the out-of-plane strain at the boom roots with time.
Figure 7B:
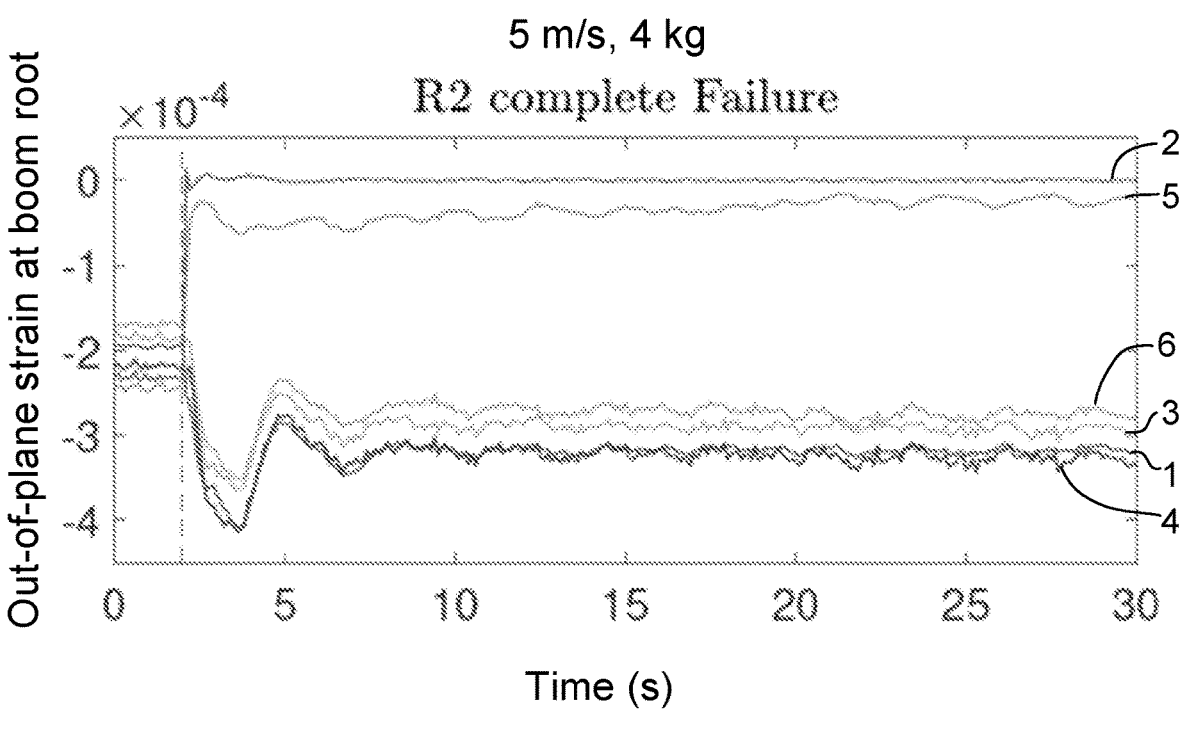

FIGS. 6A-7B show the strain signals under faults of rotors 1 and 2, respectively, and their varying magnitudes under an exemplary flight state. The rotor faults occur at 2 s, as indicated by the dashed vertical line. It should be noted that due to faults, the signals have a transient response before reaching the controller-compensated steady state. In FIGS. 6A-6B, degradation of rotor 1 has resulted in the decrease of the absolute value of strain on the boom corresponding to rotor 1 due to loss of thrust. To compensate for the yaw imbalance due to this fault, rotor 4 also slows down. Similarly, in FIGS. 7A-7B, the response of other rotors to a rotor 2 fault is seen. Notably, the rotor fault magnitude has a direct relation with the change from the healthy value of strain on the boom it is mounted upon. Under complete failure of rotors, or 100% degradation, the strain value goes to zero due to zero thrust generated. Therefore, embodiments of the present technology use the variation of strain on the respective boom to estimate the fault magnitude after it is detected and identified. The pattern of how the rotors respond to gusts and faults is utilized to distinguish them. Notably, contrary to faults, the change in signals due to gusts lasts only for its duration. Rotor faults cannot be reversed and hence the change in the signals continue throughout flight time.

Figure 8:
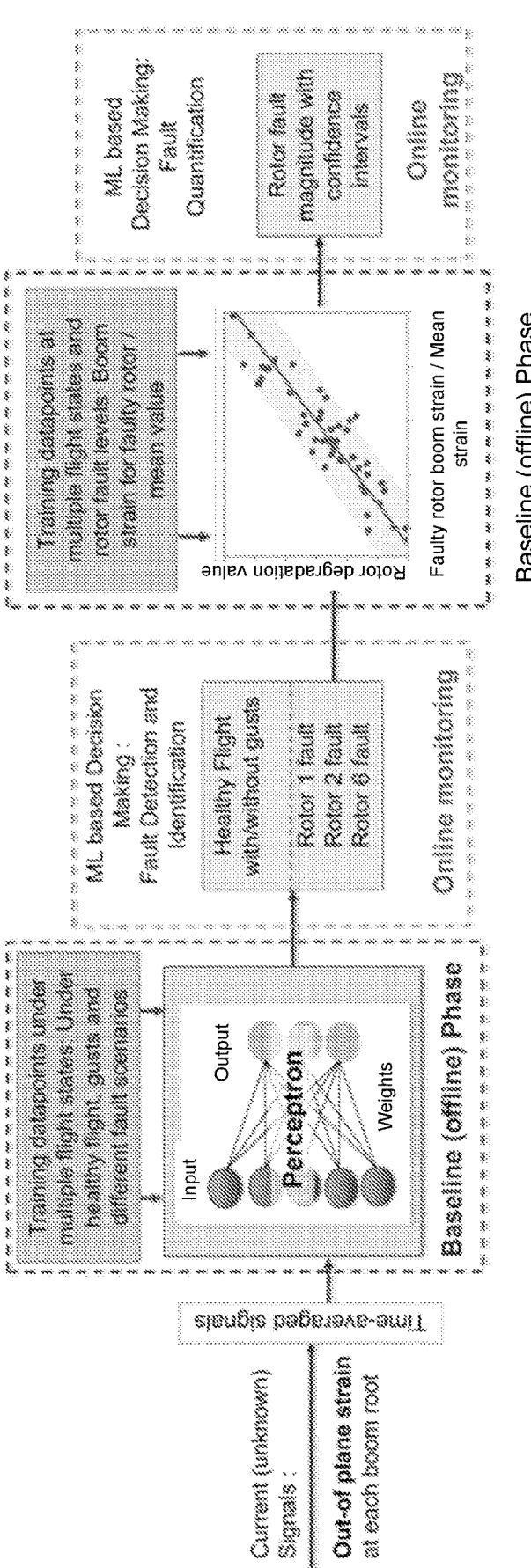
FIG. 8 is a schematic view of a machine-learning framework for online probabilistic rotor fault detection, identification, and quantification according to an exemplary embodiment of the present technology.

Embodiments of the present technology are directed to the development of a data-driven framework for probabilistic rotor fault diagnosis utilizing the carefully selected in-flight data streams via the application of one or more machine-learning algorithms. The simulation data shows from the 6 local signals (out-of-plane strain at all boom roots) that the change in their absolute magnitude closely reflects the actual rotor speeds. Under different operating conditions, such as healthy flight with or without gusts, and different rotor fault scenarios, the statistical mean of signals will change relative to each other, forming some distinguishing patterns. In some embodiments, these patterns are classified via a pattern recognition algorithm, such as a perceptron, to simultaneously detect and identify faults. In some embodiments, if a fault is detected, the strain signal from the faulty rotor boom is used for fault quantification by a linear regression framework since the absolute value of strain depends on the rotor speed and consequently the value of degradation. In some embodiments, a normalization of the faulty rotor boom strain is performed to account for the multiple flight states without any knowledge of the current operating conditions in the inspection phase. FIG. 8 shows a workflow diagram of an exemplary rotor fault detection and identification ("FDI") framework according to the present technology.

Perceptron is a computer learning method devised to simulate the ability of the brain to recognize and discriminate. It is the building block of complex neural networks. This machine learning method enables distributed information processing with neurons arranged in layers and executed in parallel. The neurons are non-linear information processing elements and the interconnections between these neurons are known as weights These weights are learned through supervised training algorithms, where the training data contain the inputs and their corresponding output labels. Neural networks can compactly represent information, perform excellent classification, and can accommodate noise and uncertainty in data with carefully chosen features and regularization parameters. These characteristics make perceptron useful for embodiments of the present technology, where an object is to develop a robust rotor FDI framework with signals affected by atmospheric disturbances encountered in actual flight. But often deep neural networks focus on fitting the data and suffer from a lack of explain-ability due to a "black-box" model. Moreover, to enable real-time decision-making with limited computational capabilities of the onboard flight computer, some embodiments of the present technology use a simple perceptron.

As discussed above, the values of out-of-plane strains at each boom root relative to each other is a useful feature for a pattern recognition algorithm to determine the aircraft health status. To determine the different fault classes from the physical knowledge of the distinctive change in the strain at the boom of the faulty rotor and their diametrically opposite pair, some embodiments use long and nested if-else statements with several confidence bounds. To avoid complicated decision-making with AND logic only, some embodiments use a compact perceptron. In such embodiments, a simple perceptron (e.g., a "no hidden layer" neural network) is trained to output one of the 4 linearly separable classes: healthy aircraft, rotor 1 faults, rotor 2 faults, and rotor 6 faults with the mean value of the 6 strain signals over a time window or period as input. The input layer is denoted by $x^T$ and the output layer is denoted by h(x) and is related as follows:

$$h(x) = \sigma\left(W^T x + B\right) \qquad (6)$$

where σ(z) indicates the SoftMax activation function, and the weight matrix and the bias vector for the layer are denoted by W and B and are determined in the baseline training phase by backpropagation learning techniques to minimize classification error. Using the cross-entropy error as cost function and SoftMax function in the output layer, the probabilities of each input element belonging to an output class is obtained.

In some embodiments, the first class is trained with healthy signals under severe turbulence with and without gusts (e.g., 8.67 m/s with different directions). The rotor 1, 2, and 6 fault classes are trained with the respective rotor fault signals under 10, 50, and 90% degradation shown in Table 1. The training data sets are divided into disjoint windows of 1 s. Each data point shows the mean of the 6 strain signals that are calculated over the window and its corresponding true class label. The number of data points are balanced for the different classes to avoid classifier bias. The details of this perceptron are given in Table 2 below.

TABLE 2

Details of the perceptron training

| Specifications | Value |
|---|---|
| Input Type | Out-of-plane strain at all boom roots |
| Input Layer Size | 6 |
| Training Function | Levenberg-Marquardt optimization |
| Hidden Layer Size | 0 |
| Output Classes | 4 (Healthy and Rotors 1, 2, and 6 faults) |
| Cost Function | Cross-Entropy |
| Activation Function | SoftMax |
| Data Partition | Leaning:Validation:Test = 50:25:25% of Training Data |
| Performance | $1.3 \times 10^{-3}$ |

In some embodiments, the mean of the out-of-plane strain at the faulty rotor boom varies linearly with the rotor fault magnitude and a linear regression model is fitted (e.g., MATLAB function: fitlm.m) as follows:

$$y = x\beta + \epsilon \quad (7)$$

$$x = [1 \quad x]$$

$$\beta = [\beta_1 \quad \beta_2]^T$$

where y denotes the rotor degradation value, x is normalized strain at the faulty rotor boom, and β is the vector of coefficients to be learnt from the training data. The normalized strain x is calculated as follows:

$$x = \frac{\mu_\varepsilon - \varepsilon_{faulty\ rotor\ boom}}{\mu_\varepsilon} \quad (8)$$

$$\mu_\varepsilon = \frac{1}{6} \sum_{i=1}^{6} \varepsilon_i$$

where $\varepsilon_i$ represents the strain at "i'th boom root, and $\mu_\varepsilon$ denotes the mean value of all the strains. In some embodiments, the total rotor speed, and consequently the mean of all the strain values are maintained at the same value before and after the rotor fault initiation to support the weight of the aircraft. The normalization of strain is used for accounting for the change in rotor strains with the various forward speeds and gross weights. Faulty rotor strain for the same rotor degradation is different for different flight states. This step helps map the value of faulty rotor boom strain linearly with the rotor degradation, such that the normalized value is 1 for complete rotor failure under all flight states.

In some embodiments, the linear regression models are trained with the faulty training data shown in Table 1. For rotor 1 faults, the strain on the boom corresponding to rotor 1 normalized with the mean of all 6 strains is used, with the labels being the true rotor degradation values. Similarly, for rotors 2 and 6 faults, the normalized strain signals from the booms corresponding to rotors 2 and 6 are used for training, respectively. The respective fault models output the predicted rotor fault magnitude once the fault is identified along with the 95% confidence intervals according to Scheffé's method. The details of the trained linear regression models are shown in Table 3 below.

TABLE 3

Details of the linear regression models

| Specifications | Value |
|---|---|
| Inputs | Out-of-plane strain at faulty rotor boom divided by the mean strain of all the booms |
| Number of coefficients | 2 |
| $R^2$ fit | 0.98, 0.97, 0.97 for rotors 1, 2, and 6 fault models, respectively |
| RMSE | 3.73, 5.72, 5.49% rotor degradation for rotors 1, 2, and 6 fault models, respectively |
| Output | Rotor degradation with confidence levels |

As shown in FIG. 9, a method of diagnosing rotor fault in a multicopter is generally designated by the numeral 200. The method 200 includes step 210, where in-flight data streams are used for online monitoring of the aircraft health condition. At step 220, the controller 30 receives the boom strain signals from the plurality of local sensors 20 as discussed above. At step 230, a mean strain signal is calculated over a time window. In some embodiments, the time window is 1 s. In some embodiments, to ensure continuous decision-making, the window is updated every 0.1 s. The computation time required to make a decision is less than 0.01 s, which is less than the window update time, making it suitable for real-time monitoring. At step 240, the mean strain signal is input into a pattern recognition algorithm, such as the perceptron discussed above, and the health condition of the multicopter 10 is output at step 250. At step 260, the controller 30 determines if the multicopter 10 is in a healthy state. A fault is detected when the perceptron outputs any class other than healthy, and that output class determines which rotor has degraded, enabling simultaneous fault detection and identification. Note that this decision is attached with a probability estimate which can help the operator to have a better insight of the fringe cases such as confusion between very mild degradation and strong gusts where the probability estimates of the two confusing classes will be about 50%, whereas in normal cases the confidence of a decision is generally more than 95%. If the multicopter 10 is healthy, then the method 200 repeats steps 220 through 260 for an updated mean strain signal. If the multicopter 10 is not healthy, the method 200 continues to step 270, where the strain for the boom 14 corresponding to the faulty rotor is divided by the mean of all the strains, and the result is input into the linear regression model discussed above at step 280. At step 290, after fault detection and identification, the linear regression model predicts the fault magnitude and its 95% confidence intervals using the normalized strain from the boom on which the faulty rotor is mounted. After step 290, the method 200 repeats at least steps 220 through 260 for an updated mean strain signal. In some embodiments, after fault detection and identification, the controller 30 generates at least one corrective control signal and communicates it to at least one of the healthy rotors to return the multicopter 10 to a healthy flight state.

FIGS. 10A-12B show exemplary indicative results for online monitoring of aircraft health with the decision-making framework discussed herein. The strain plots corresponding to rotors 1, 2, 3, 4, 5, and 6 are respectively labeled 1, 2, 3, 4, 5, and 6. The top subplots show the mean of signals over a window of 1 s, updated every 0.1 s, that are used as input to the decision-making framework. The bottom subplots show the decision output by the framework at each time window. The x-axis shows the time of flight in seconds in both plots. Since, it is required to collect signals for the required time window initially, the online monitoring starts at 1 s. If the decision marker is shown in "+," the aircraft is healthy. Otherwise, the markers "*," "o," and "x" denote fault of rotor 1, 2, and 6, respectively. The fault magnitude is shown by the y-axis in the bottom plots.

Figure 10A:
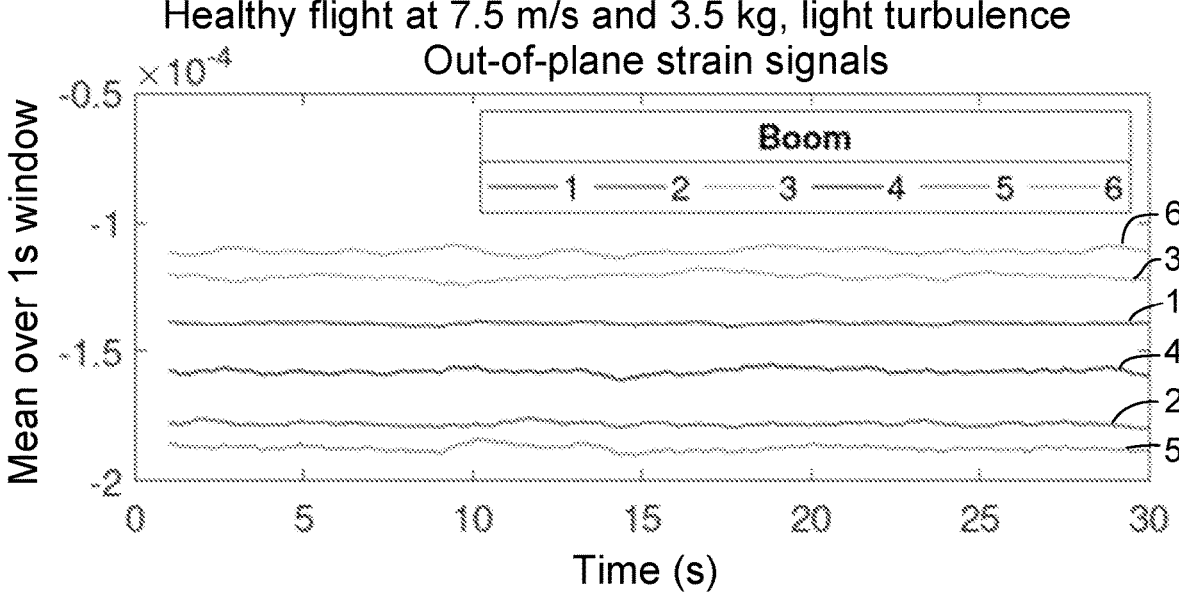
FIGS. 10A-10B are charts of indicative diagnostic results during the online inspection phase of healthy flight under light turbulence and healthy flight with gust of $10(-1\hat{i}+0\hat{j}+0\hat{k})$ m/s, respectively.
Figure 10A:
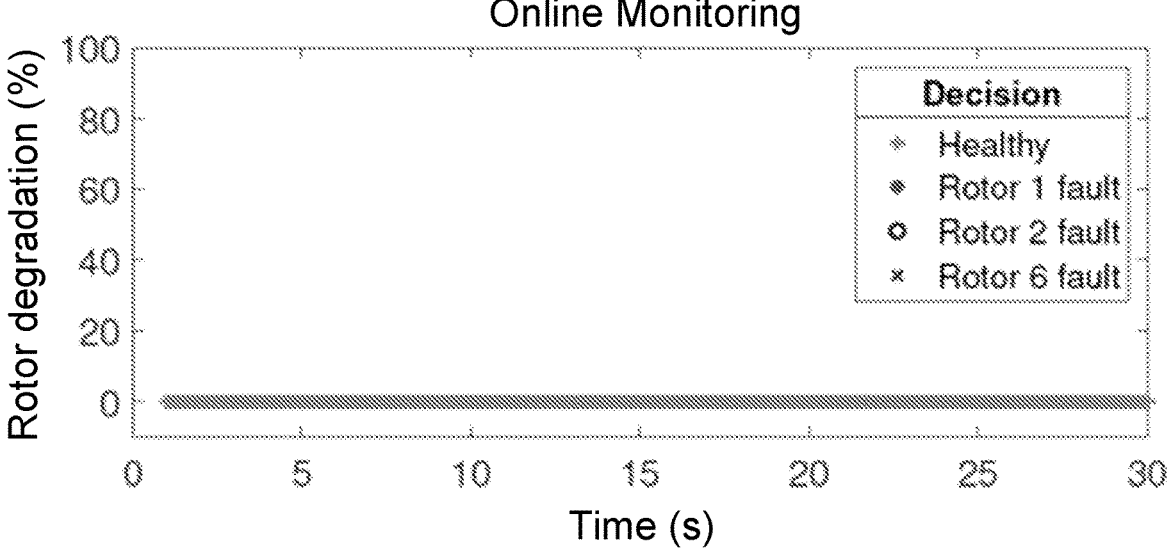
Figure 10B:
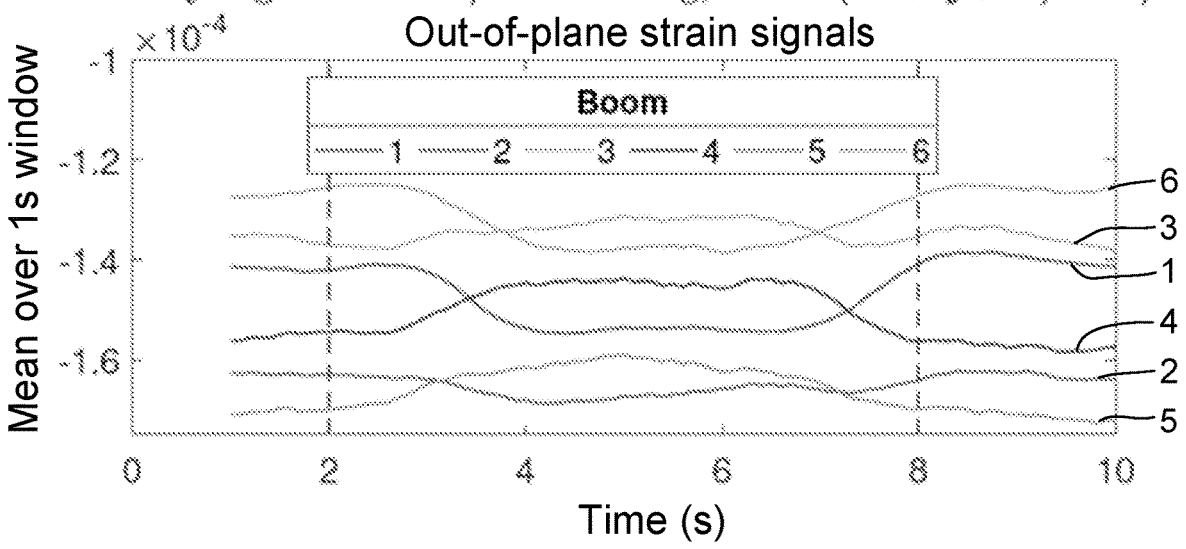
Figure 10B:
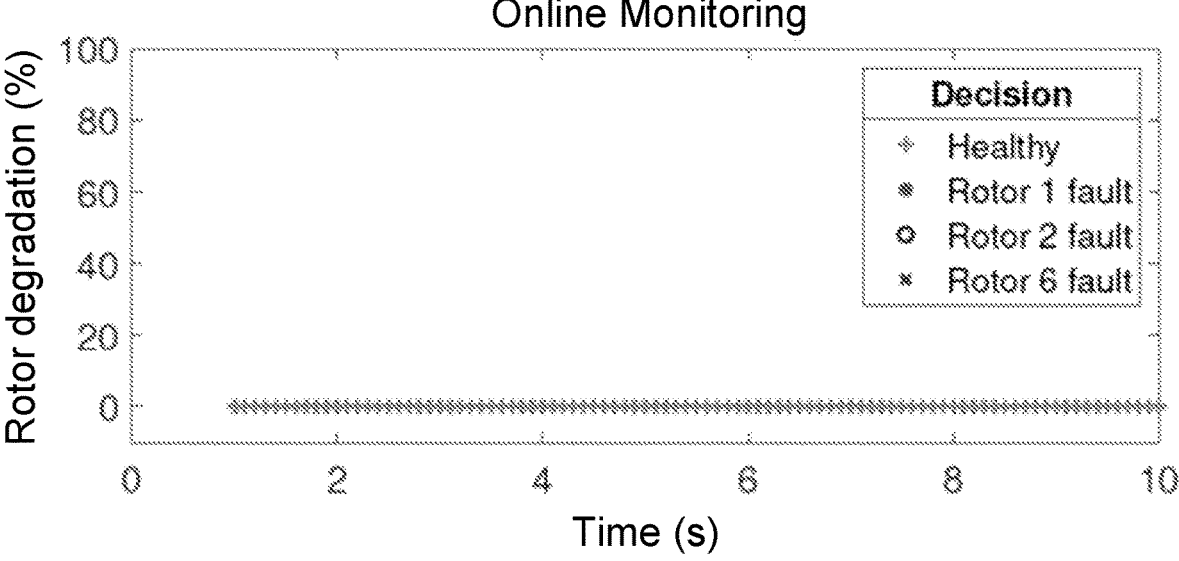

FIG. 10A shows the correct health prediction for a healthy flight under light turbulence. As shown, the decision marker remains "+," denoting healthy flight even under operating conditions of 7.5 m/s and 3.5 kg, a flight state not used during the training phase.

Figure 11A:
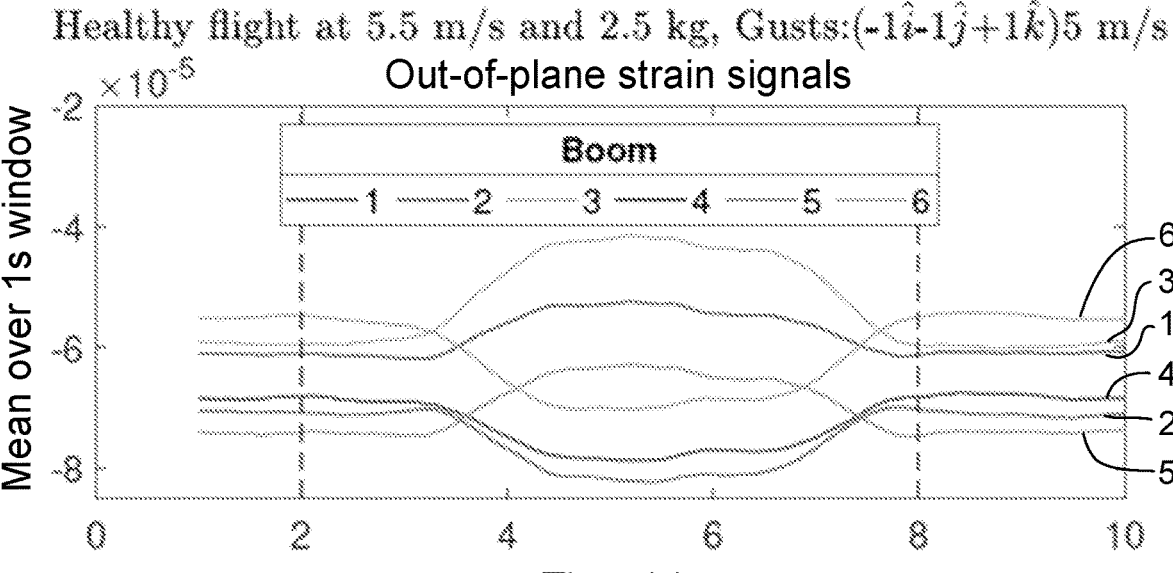
FIGS. 11A-11B are charts of indicative diagnostic results during the online inspection phase of healthy flight with gust of $5$ $(-1\hat{i}-1\hat{j}+1\hat{k})$ m/s and 80% degradation of rotor 1, respectively.
Figure 11A:
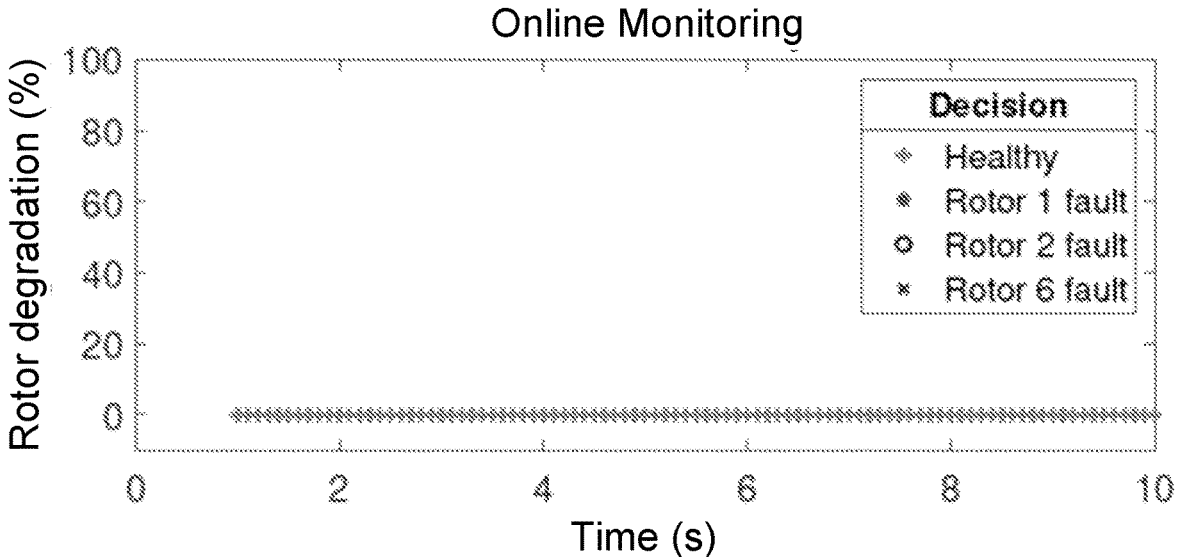

FIGS. 10B-11A show accurate health monitoring even under aggressive gusts of magnitude 10 m/s and 8.67 m/s, respectively, and unmodeled flight states. The aircraft (i.e., multicopter 10) responds to maintain its commanded speed under such gusts, causing significant changes in the aircraft dynamics. Moreover, FIG. 11A shows that the absolute value of strain for the boom corresponding to rotor 1 decreases to counter the compound gust, thus mimicking a rotor 1 fault. But with the trained perceptron based on the local signals, as discussed above, the health of the aircraft encountering both indicative gusts are correctly determined as healthy.

FIGS. 11B-12B show indicative results for online monitoring under rotor faults. Note that for the results presented both the operating conditions and the rotor fault magnitudes (80, 60, and 20% degradation) considered were not used in the training phase. In the top plots, the time of fault commencement is indicated by the vertical dashed lines. In the bottom plots, the time of fault detection is indicated by the vertical dashed lines. In the bottom plots, the true value of rotor degradation is shown by a solid horizontal line. The fault detection and classification are depicted by the marker changing from "+" to "*," "0," or "x," depending on the rotor fault. If the true fault magnitude lies within the 95% confidence interval of the predicted values, shown by the vertical segments at each decision marker, it denotes a correct fault quantification. The precision of fault quantification (i.e., the absolute difference between the predicted and true value is given by the proximity of the predicted values and the true value of rotor degradation.

Figure 11B:
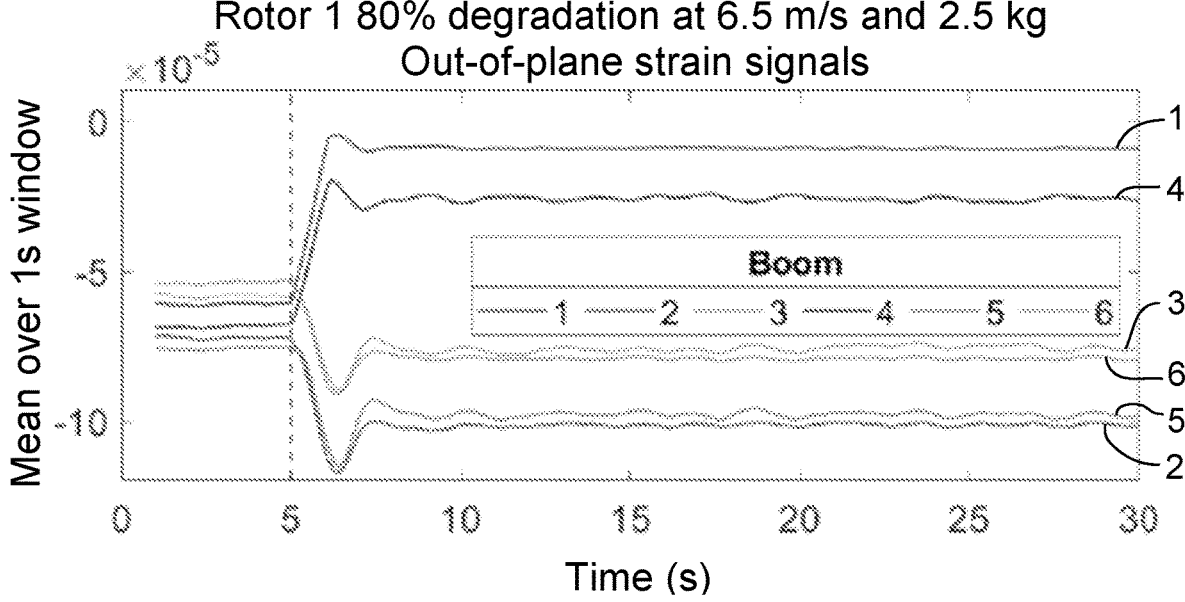
Figure 11B:
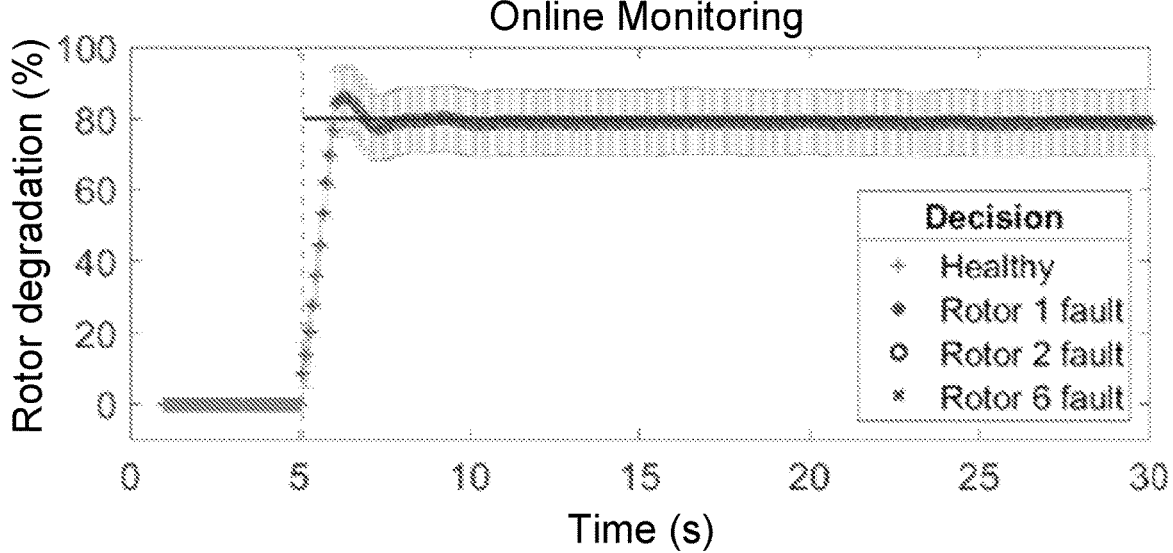
Figure 12A:
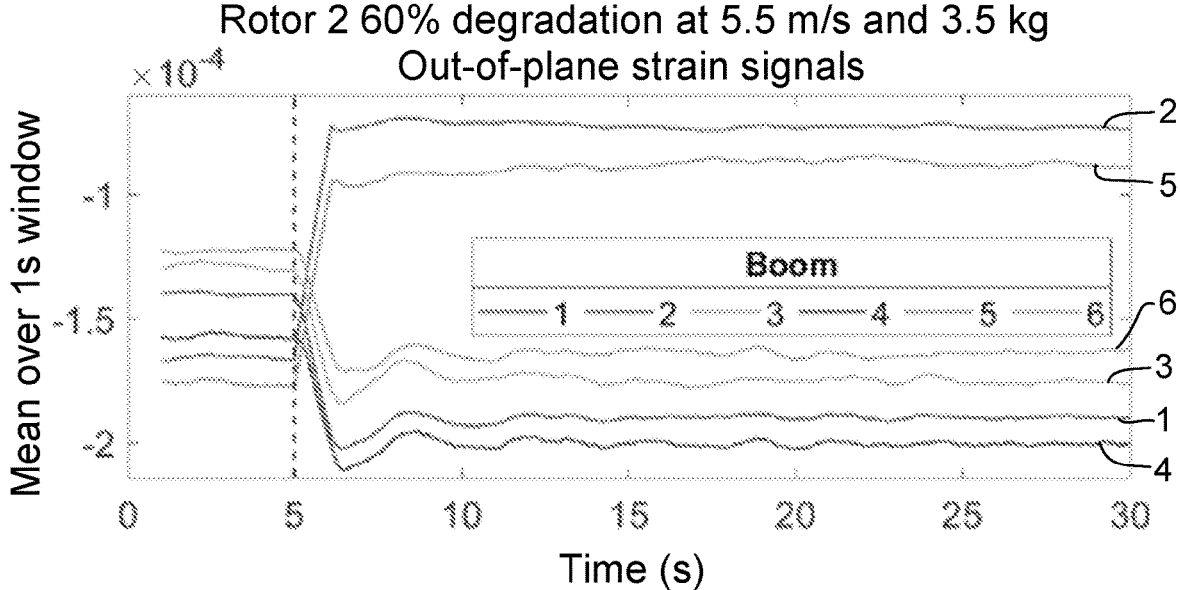
FIGS. 12A-12B are charts of indicative diagnostic results during the online inspection phase of 60% degradation of rotor 2 and 20% degradation of rotor 6, respectively.
Figure 12A:
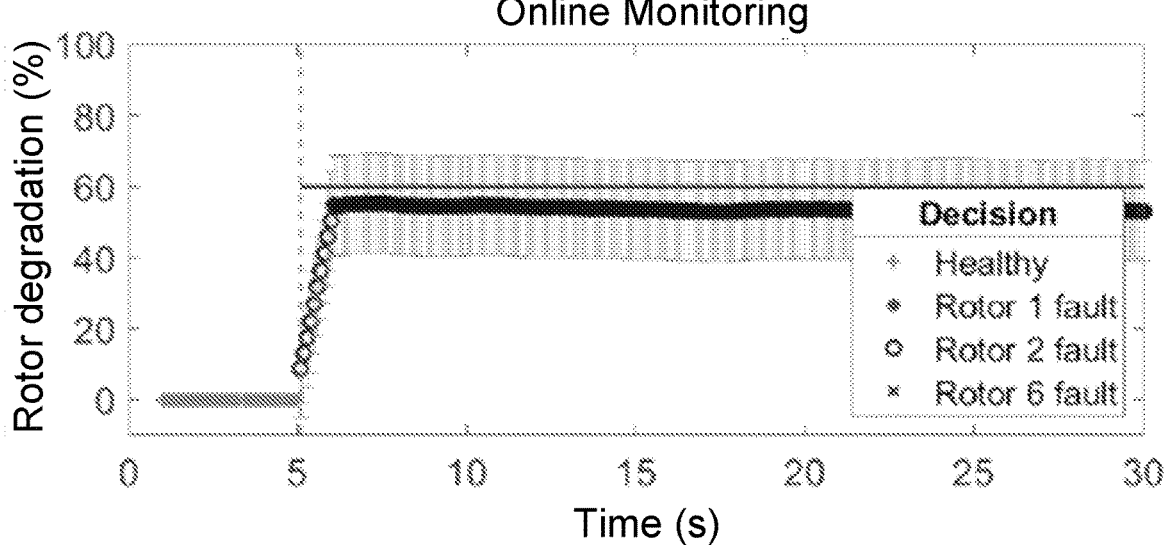
Figure 12B:
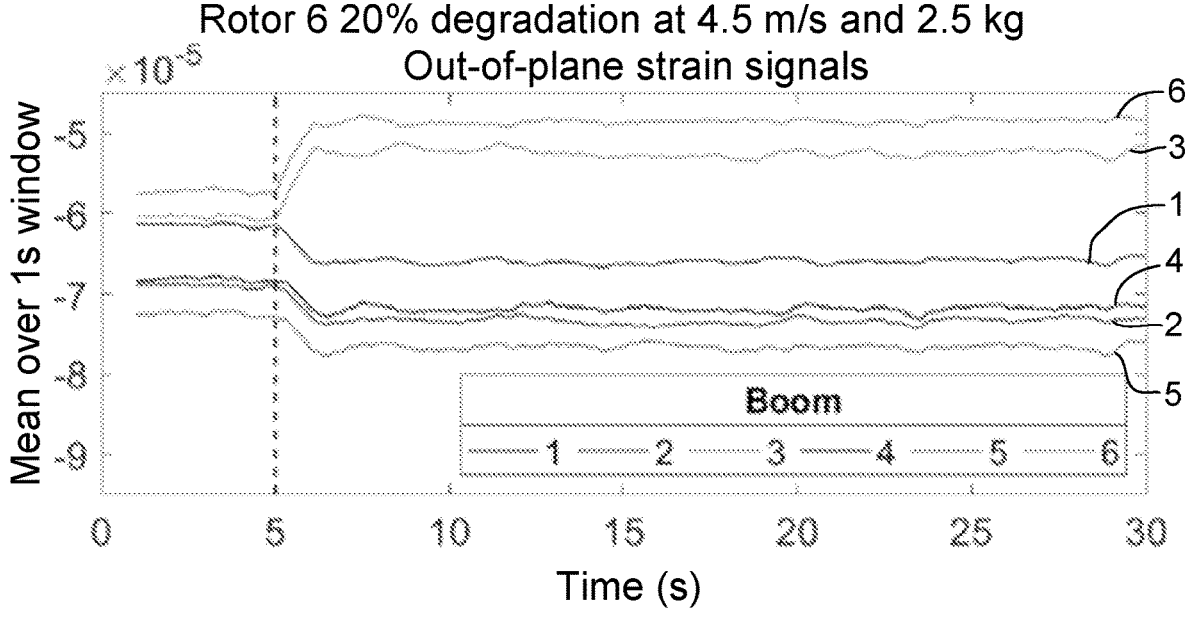
Figure 12B:
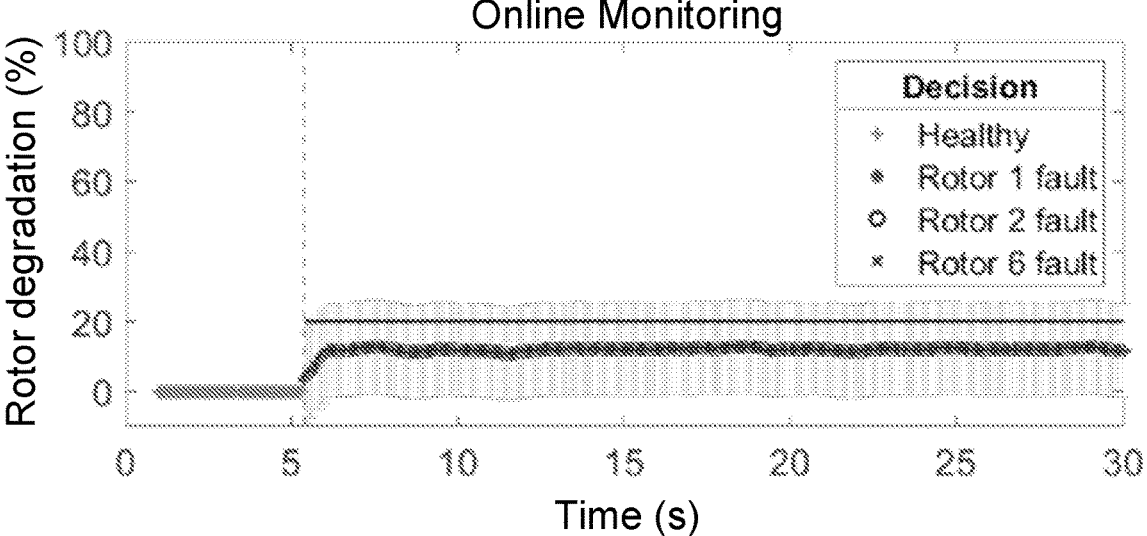

FIG. 11B shows correct rotor fault diagnosis of rotor 1, 80% degradation at an unmodeled flight state of 6 m/s and 2.5 kg. The fault is detected and classified within 0.1 s of fault commencement, denoted by the marker changing in the bottom plot. However, just after the fault detection and classification, the fault quantification becomes accurate only after the transient phase of the signals are over and they become steady, as shown in the top plot. This lag is also caused by the fact that the signals are time-averaged over its past values in a 1 s interval. Thus, the fault is accurately quantified within 1 s of the fault commencement, evident by the true rotor degradation lying in between the 95% confidence intervals shown in the vertical error bars. Also, it can be observed that fault quantification is quite precise since the true value and the predicted values are very close to each other. Similar speed of rotor FDI and efficiency of quantification are observed for rotors 2 and 6 faults in FIGS. 12A and 12B, respectively. It is evident that a fault is always detected within 0.3 s of its commencement with a longer time needed for mild degradation levels, as is seen in FIG. 12B, where a 20% rotor fault needs 0.3 s to be detected.

Figure 13:
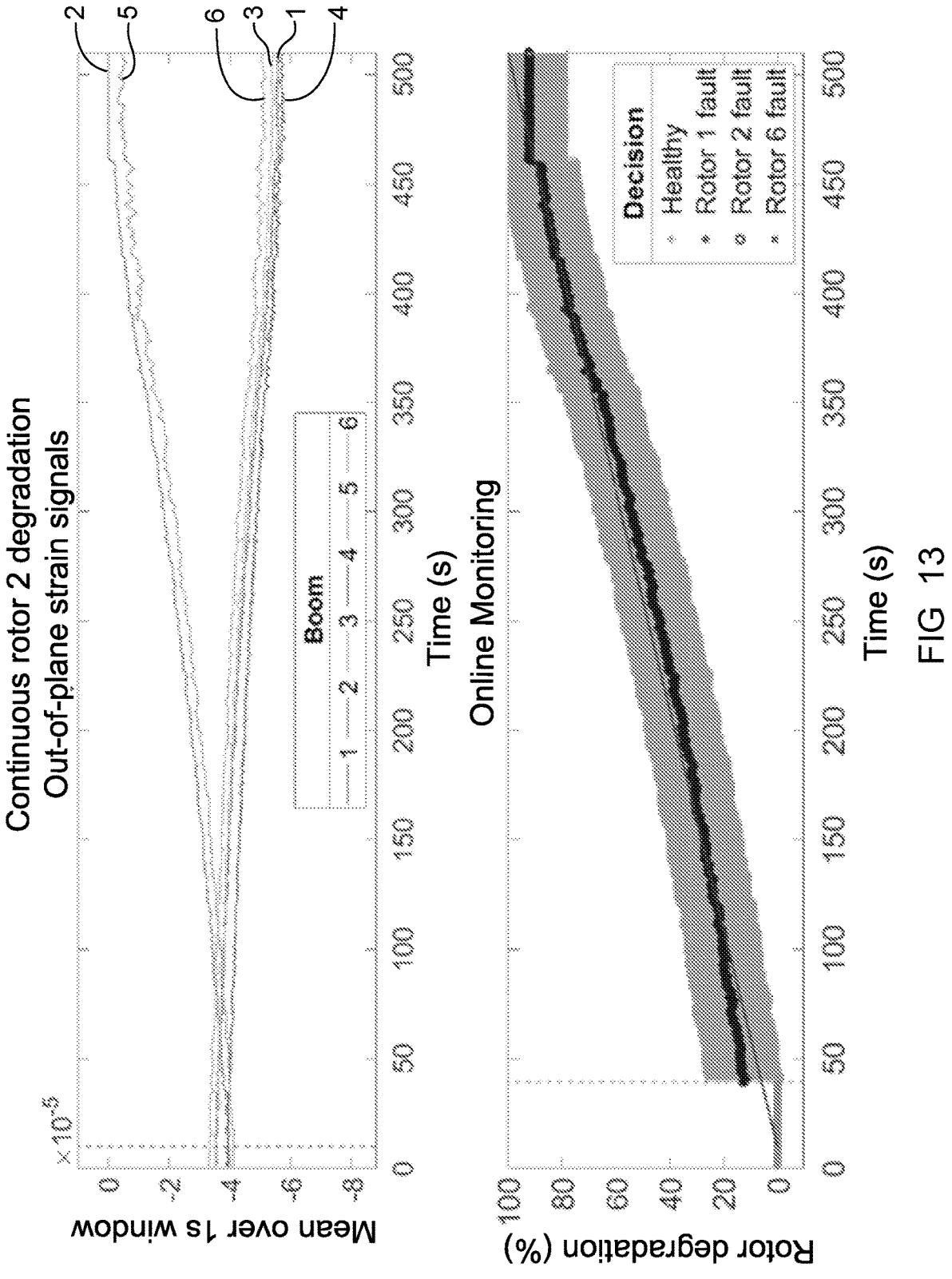
FIG. 13 shows charts of indicative diagnostic results during the online inspection phase for continuous degradation of rotor 2 at a rate of 0.2% degradation per second starting at 10 s.

Indicative results for incipient faults of rotor 2 at 2 kg and 5 m/s is shown in FIG. 13. The strain plots corresponding to rotors 1, 2, 3, 4, 5, and 6 are respectively labeled 1, 2, 3, 4, 5, and 6. The rotor starts to degrade, or its speed reduces, at a rate of 0.2% per second, starting at 10 s, shown as the vertical dashed line on the top plot. The solid diagonal line in the bottom plot shows the true value of progression of the rotor fault. The fault is detected and identified at 39.5 s, shown by the vertical dashed line in the bottom plot, when the rotor fault has progressed to a value of 5.9% degradation. Post fault detection, its magnitude is correctly estimated, as the true values falls in between the 95% confidence intervals shown by the vertical error bars.

Accordingly, embodiments of the present technology analyze the change in the mean values of out-of-plane signals under different rotor faults with the engineering knowledge of the hexacopter coupled with logical AND functions, to detect and classify them. The perceptron, which performs the operation discussed above in a compact manner, is capable of efficient rotor FDI even under various known operating conditions which have not been used to train it. This property, known as the generalization capability of the perceptron has been demonstrated with the test data in the inspection phase. The flight conditions include intermediate forward speeds and gross weights, light levels of turbulence and gusts of higher magnitudes (than used in training) in healthy flight and unmodeled rotor fault levels (as shown in Table 1). The performance of this framework on test data is summarized in Tables 4A and 4B, below. For each dataset, a number of decisions are made throughout the flight time with moving windows. The fault classification and quantification accuracy denote the percentage of those decisions where the correct health condition is determined, and whether the true rotor degradation value lies in between the predicted 95% confidence intervals, respectively. The fault prediction error gives the error in point estimation of the fault magnitude, and its mean and standard deviation are given in rotor degradation magnitude (% rotor degradation).

TABLE 4

| Summary results for rotor fault detection, identification, and quantification |
| --- |

| (a) Healthy aircraft under turbulence and gusts | | |
| --- | --- | --- |
| Health condition | Operating condition | Classification accuracy (%) |
| Healthy flight | Unmodeled flight states & severe turbulence | 100 |
|  | Modeled flight states & light turbulence | 100 |
| Healthy flight under gusts | Unmodeled flight states & 5 m/s gusts | 99.3 |
|  | Unmodeled flight states & 10 m/s gusts | 99.6 |

| (b) Faulty aircraft | | | | | | |
| --- | --- | --- | --- | --- | --- | --- |
|  |  |  |  | Fault Prediction error (% degradation) | | Average time of fault |
| Operating condition | Health condition | Classification accuracy (%) | Quantification accuracy (%) | Average Value | Standard Deviation | detection (s) |
| Modeled flight states & unmodeled degradations | Rotor 1 faults | 100 | 99.1 | 4.34 | 2.39 | 0.280 |
|  | Rotor 2 faults | 100 | 99.1 | 5.14 | 3.45 | 0.198 |
|  | Rotor 6 faults | 99.9 | 99.3 | 4.18 | 4.29 | 0.236 |
| Unmodeled flight states & unmodeled degradations | Rotor 1 faults | 100 | 99.1 | 4.58 | 2.55 | 0.237 |
|  | Rotor 2 faults | 100 | 99.2 | 5.50 | 2.97 | 0.152 |
|  | Rotor 6 faults | 99.9 | 99.2 | 4.34 | 3.83 | 0.190 |

As shown in Table 4A, although the perceptron was trained with healthy data under certain flight states and severe turbulence only, it gives perfect classification with intermediate flight states, and light turbulence, too. For gusts, even with unmodeled flight states, gust directions, and gust magnitudes (higher and lower than used for training the perceptron), the health condition classification accuracy is maintained over 99%.

As shown in Table 4B, the rotor faults under both modeled and unmodeled operating conditions, and intermediate degradation levels which have not been considered in the training phase, have been accurately classified. The fault quantification accuracy is over 99%. Here, the slight decrease in accuracy is attributed to the fact that in the transient phase of the signals the fault magnitude is incorrectly predicted as lesser than the correct value obtained with the steady-state signals. The fault prediction error (i.e., the difference between the predicted and true value of fault magnitude) average over all datasets and decision points is 4.7% rotor degradation. The standard deviation of the fault prediction error is about 3.2% rotor degradation. Lower values of the mean and standard deviation of the fault prediction error implies that the fault quantification is accurate with tight confidence intervals. The average and maximum of the range of 95% confidence intervals is 18% and 28% rotor degradation, respectively. The fault detection time is in multiples of the windows update interval, i.e., 0.1 s. In some embodiments, the maximum time to detect a fault is 0.3 s. Abrupt mild rotor faults require more time to be detected, and abrupt faults over 50% degradation generally require 0.1 s. The average time of fault detection is calculated by averaging over all the test data sets and it is observed to be less than 0.3 s. Data sets with continuous rotor degradation at a rate of 2%/s, 0.5%/s, and 0.2%/s for each type of rotor fault at one modeled and one unmodeled flight state have been studied to determine the lowest rotor fault magnitude to be detected as a fault by this framework. In some embodiments, while a fault even as low as 5.2% degradation triggers a detection, the decision becomes stable at 8% or greater degradation.

Accordingly, exemplary embodiments of the present technology are directed to systems and methods for machine-learning based probabilistic online rotor fault diagnosis in multicopters. The systems and methods use in-flight out of-plane strain measurements at each of the multicopter booms to detect, identify, and quantify rotor faults while distinguishing them from the aircraft response to random wind gusts and turbulence. In exemplary embodiments, the systems and methods are demonstrated with application to a 2-feet diameter (rotor hub-to-hub distance) hexacopter flying under varying forward velocity and gross weight configurations, atmospheric disturbances, and uncertainty. In some embodiments, the method includes a baseline phase and an inspection phase. In the baseline phase, machine-learning algorithms, such as a perceptron and linear regression model, are trained based on out-of-plane strain signals measured from strain gauges placed at each one of the boom roots. The inspection phase includes (1) simultaneous rotor fault detection and identification, and (2) fault quantification within the identified type of fault. Fault magnitude is considered to be continuous, involving an infinite number of potential fault magnitudes ranging from healthy to complete failure. The effectiveness of the method was assessed via application to various unmodeled aircraft operating at various health conditions. The method permits real-time, online health monitoring of multicopters as demonstrated by the speed of decision-making under any admissible operating condition, excellent accuracy regarding distinguishing gusts from rotor faults, and precise fault magnitude estimation with narrow uncertainty bounds.

As will be apparent to those skilled in the art, various modifications, adaptations, and variations of the foregoing specific disclosure can be made without departing from the scope of the technology claimed herein. The various features and elements of the technology described herein may be combined in a manner different than the specific examples described or claimed herein without departing from the scope of the technology. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the technology.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about." The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents of carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the technology encompasses not only the entire group listed as a whole, but each member of the group individually and all possible subgroups of the main group. Additionally, for all purposes, the technology encompasses not only the main group, but also the main group absent one or more of the group members. The technology therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A rotor fault diagnosis system for a multicopter that comprises a plurality of booms and a plurality of rotors, each of which are secured to a distal end of a respective one of the plurality of booms, the system comprising:
   - a plurality of local sensors, each of which are secured to a respective one of the plurality of booms; the plurality of local sensors are configured to measure out-of-plane strain of the plurality of booms and to continuously generate boom strain signals; and
   - a controller in communication with the plurality of local sensors; the controller is configured to receive the continuously generated boom strain signals and perform a pattern recognition algorithm to simultaneously detect and identify faults associated with the plurality of rotors.

2. The system of claim 1, wherein the multicopter further comprises a body to which a proximal end of each of the plurality of booms is secured and from which each of the plurality of booms extends; and
   wherein each of the plurality of local sensors are secured to the proximal end of the respective one of the plurality of booms and positioned adjacent the body and at a distance from the body.

3. The system of claim 2, wherein the controller is a component of an onboard flight computer secured to the body of the multicopter.

4. The system of claim 1, wherein each of the plurality of local sensors is a strain gauge.

5. The system of claim 1, wherein the pattern recognition algorithm comprises a perceptron configured to receive as input a mean value of the boom strain signals over a duration and to output one of a plurality of linearly separable classes associated with a flight state of the multicopter.

6. The system of claim 5, wherein the duration is 1 second and the mean value of the boom strain signals is recalculated every 0.1 seconds based on the continuously generated boom strain signals.

7. The system of claim 5, wherein the plurality of linearly separable classes comprises healthy flight with wind gusts and with turbulence, healthy flight with gusts and without turbulence, healthy flight with turbulence and without wind gusts, healthy flight without turbulence and without wind gusts, and faults for each of the plurality of rotors.

8. The system of claim 1, wherein if the pattern recognition algorithm detects and identifies a fault associated with any one of the plurality of rotors, the controller is configured to perform a linear regression algorithm to quantify the fault of the rotor.

9. The system of claim 8, wherein the linear regression algorithm is configured to receive as input the out-of-plane strain measured by the local sensor of the boom associated with the faulty rotor divided by a mean out-of-plane strain of the plurality of booms and to output a predicted magnitude of degradation of the faulty rotor and a confidence interval of the predicted magnitude.

10. The system of claim 1, wherein if the pattern recognition algorithm detects and identifies a fault associated with any one of the plurality of rotors, the controller is configured to generate and communicate at least one corrective control signal to at least one of the non-faulty rotors to return the multicopter to a healthy flight state.

11. A method of diagnosing rotor fault in a multicopter that comprises a plurality of booms and a plurality of rotors, each of which are secured to a distal end of a respective one of the plurality of booms, the method comprising:

continuously measuring, via a plurality of local sensors, out-of-plane strain of the plurality of booms to continuously generate boom strain signals, each of the plurality of local sensors are secured to a respective one of the plurality of booms;

receiving, at a controller in communication with the plurality of local sensors, the continuously generated boom strain signals; and performing, via the controller, a pattern recognition algorithm to simultaneously detect and identify faults associated with the plurality of rotors.

12. The method of claim 11, wherein the multicopter further comprises a body to which a proximal end of each of the plurality of booms is secured and from which each of the plurality of booms extends; and wherein each of the plurality of local sensors are secured to the proximal end of the respective one of the plurality of booms and positioned adjacent the body and at a distance from the body.

13. The method of claim 12, wherein the controller is a component of an onboard flight computer secured to the body of the multicopter.

14. The method of claim 11, wherein each of the plurality of local sensors is a strain gauge.

15. The method of claim 11, wherein the step of performing the pattern recognition algorithm comprises:

calculating an initial mean value of the boom strain signals received over an initial 1 second duration;

inputting the mean value of the boom strain signals into a perceptron trained using data associated with a plurality of multicopter flight states and rotor fault scenarios; and outputting one of a plurality of linearly separable classes associated with a flight state of the multicopter.

16. The method of claim 15, wherein if the perceptron outputs a linearly separable class associated with a healthy flight state of the multicopter, the step of performing the pattern recognition algorithm further comprises:

calculating an updated mean value of the boom strain signals received over an updated 1 second duration shifted 0.1 seconds forward from the initial 1 second duration; and repeating the inputting and outputting steps to determine an updated flight state of the multicopter based on the updated mean value of the boom strain signals.

17. The method of claim 15, wherein the plurality of linearly separable classes comprises healthy flight with wind gusts and with turbulence, healthy flight with gusts and without turbulence, healthy flight with turbulence and without wind gusts, healthy flight without turbulence and without wind gusts, and faults for each of the plurality of rotors.

18. The method of claim 11, wherein if the pattern recognition algorithm detects and identifies a fault associated with any one of the plurality of rotors, further comprising:

performing, via the controller, a linear regression algorithm to quantify the fault of the rotor.

19. The method of claim 17, wherein the step of performing the linear regression algorithm comprises:

inputting the out-of-plane strain measured by the local sensor of the boom associated with the faulty rotor divided by a mean out-of-plane strain of the plurality of booms into a linear regression model trained using data associated with a plurality of multicopter flight states and rotor fault levels; and outputting a predicted magnitude of degradation of the faulty rotor and a confidence level of the predicted magnitude.

20. The method of claim 11, wherein if the pattern recognition algorithm detects and identifies a fault associated with any one of the plurality of rotors, further comprising:

generating, via the controller, at least one corrective control signal; and communicating the at least one corrective control signal to at least one of the non-faulty rotors to return the multicopter to a healthy flight state.

21. A multicopter, comprising:

a plurality of booms;

a plurality of rotors, each of which are secured to a distal end of a respective one of the plurality of booms; and a rotor fault diagnosis system, comprising:

a plurality of local sensors, each of which are secured to a respective one of the plurality of booms; the plurality of local sensors are configured to measure out-of-plane strain of the plurality of booms and to continuously generate boom strain signals; and a controller in communication with the plurality of local sensors; the controller is configured to receive the continuously generated boom strain signals and perform a pattern recognition algorithm to simultaneously detect and identify faults associated with the plurality of rotors.

22. The multicopter of claim 21, further comprising a body to which a proximal end of each of the plurality of booms is secured and from which each of the plurality of booms extends; and wherein each of the plurality of local sensors are secured to the proximal end of the respective one of the plurality of booms and positioned adjacent the body and at a distance from the body.

23. The multicopter of claim 21, wherein each of the plurality of local sensors is a strain gauge.

24. The multicopter of claim 21, wherein the pattern recognition algorithm comprises a perceptron configured to receive as input a mean value of the boom strain signals over a duration and to output one of a plurality of linearly separable classes associated with a flight state of the multicopter.

25. The multicopter of claim 24, wherein the plurality of linearly separable classes comprises healthy flight with wind gusts and with turbulence, healthy flight with gusts and without turbulence, healthy flight with turbulence and without wind gusts, healthy flight without turbulence and without wind gusts, and faults for each of the plurality of rotors.

26. The multicopter of claim 21, wherein if the pattern recognition algorithm detects and identifies a fault associated with any one of the plurality of rotors, the controller is configured to perform a linear regression algorithm to quantify the fault of the rotor.

27. The multicopter of claim 26, wherein the linear regression algorithm is configured to receive as input the out-of-plane strain measured by the local sensor of the boom associated with the faulty rotor divided by a mean out-of-plane strain of the plurality of booms and to output a predicted magnitude of degradation of the faulty rotor and a confidence interval of the predicted magnitude.

28. The multicopter of claim 21, wherein if the pattern recognition algorithm detects and identifies a fault associated with any one of the plurality of rotors, the controller is configured to generate and communicate at least one corrective control signal to at least one of the non-faulty rotors to return the multicopter to a healthy flight state.

29. The multicopter of claim 21, wherein the controller is a component of an onboard flight computer secured to the body of the multicopter.

* * * * *